United States Patent

Reynolds

[15] 3,701,855

[45] Oct. 31, 1972

[54] FIRST IDLE LINE PICKUP SERVICE

[72] Inventor: Howard Lloyd Reynolds, Boulder, Colo.

[73] Assignee: Bell Telephone Laboratories, Incorporated, Murray Hill, N.J.

[22] Filed: Jan. 18, 1971

[21] Appl. No.: 107,003

[52] U.S. Cl...............................179/18 ES, 179/18 B

[51] Int. Cl...............................................H04q 3/60

[58] Field of Search........179/18 ES, 18 AH, 18 B, 18 BA, 179/18 FC

[56] References Cited

UNITED STATES PATENTS 3,519,757 7/1970 Anderson..............179/18 ES

*Primary Examiner*—Thomas B. Habecker
*Attorney*—R. J. Guenther and James Warren Falk

[57] ABSTRACT

A key telephone system arrangement is disclosed which comprises a plurality of station modules and line modules both of which respond to program instructions for controlling the interconnection of lines to key stations. The arrangement includes equipment directed by the program for automatically selecting an idle line in a prescribed manner from the lines terminated at a station and for connecting the selected line to the set without the necessity for depressing a line pickup key.

21 Claims, 23 Drawing Figures

INVENTOR
H. L. REYNOLDS
BY
Henry J. Walsh
ATTORNEY

J-K FLIP FLOP

TRUTH TABLE

| J | K | OUTPUT AT TERM "1" |
|---|---|---|
| 0 | 1 | 0 |
| 1 | 0 | 1 |
| 1 | 1 | $\bar{Q}$ (TOGGLE) |
| 0 | 0 | Q (NO STATE CHANGE) |

D FLIP FLOP

TRUTH TABLE

| D | OUTPUT AT TERM "1" |
|---|---|
| 1 | 1 |
| 0 | 0 |

S-C FLIP FLOP

TRUTH TABLE

| S | C | OUTPUT AT TERM "1" |
|---|---|---|
| 0 | 1 | 0 |
| 1 | 0 | 1 |
| 1 | 1 | Q (NO STATE CHANGE) |
| 0 | 0 | $\bar{Q}$ (TOGGLE) |

SHIFT REGISTER

LOGIC GATES

TRUTH TABLE FOR DECODER 90

| A | B | C | OUTPUT SIGNAL AT TERMINAL |
|---|---|---|---|
| 0 | 0 | 1 | 1 |
| 0 | 0 | 0 | 2 |
| 1 | 0 | 0 | 3 |
| 1 | 1 | 0 | 4 |
| 0 | 1 | 1 | 5 |
| 1 | 0 | 1 | 6 |
| 1 | 1 | 1 | 7 NOT USED |
| 0 | 1 | 0 | 8 NOT USED |

TRUTH TABLE FOR ALL DECODERS EXCEPT DECODER 90

| A | B | C | OUTPUT SIGNAL AT TERMINAL |
|---|---|---|---|
| 0 | 0 | 0 | 0 |
| 1 | 0 | 0 | 1 |
| 0 | 1 | 0 | 2 |
| 0 | 1 | 1 | 3 |
| 0 | 0 | 1 | 4 |
| 1 | 0 | 1 | 5 |
| 0 | 1 | 1 | 6 |
| 1 | 1 | 1 | 7 |

MULTIPLEXER

| ENABLE SIGNALS A | B | C | INPUT TERM. NO. CONNECTED TO TERM. D |
|---|---|---|---|
| 0 | 0 | 0 | 0 |
| 1 | 0 | 0 | 1 |
| 0 | 1 | 0 | 2 |
| 1 | 1 | 0 | 3 |
| 0 | 0 | 1 | 4 |
| 1 | 0 | 1 | 5 |
| 0 | 1 | 1 | 6 |
| 1 | 1 | 1 | 7 |

MULTIPLEXER

| ENABLE SIGNALS A | B | INPUT TERM. NO. CONNECTED TO TERM. D |
|---|---|---|
| 0 | 0 | 0 |
| 1 | 0 | 1 |
| 0 | 1 | 2 |
| 1 | 1 | 3 |

FIRST IDLE LINE PICKUP SERVICE

BACKGROUND OF THE INVENTION

1. Field of the Invention

This invention concerns program controlled key telephone systems, and more particularly, arrangements for automatically connecting lines to key telephone stations to effect an equitable distribution of call traffic.

2. Description of the Prior Art

Certain commercial telephone installations generate a large volume of outgoing call traffic in the normal course of business. These are typically mail order firms, catalog sales departments and organizations specializing in canvassing, or poll taking, by telephone. Many telephone lines must be provided to service these systems and these lines are ordinarily terminated at key station sets. The lines are multipled between sets and assigned so as to assure the most efficient use of the lines. In this type of installation it is also common to find key station sets replaced by call director sets which furnish expanded key fields.

To establish a voice path at any station between a handset and a particular line, a key must be momentarily depressed to activate the connecting circuitry. However, before a key is activated, the call originator is required to scan the line lamp indications for the idle-busy state of each line. Care must be exercised to avoid accidental interference with established calls. In systems with a high density of call originating traffic, the task of locating a free line during a busy hour can be monumental. Moreover, in business telephone arrangements in which the efficiency of the enterprise is directly related to the number of calls established, such characteristic manual operations are unacceptable.

Automatic call distribution arrangements are known in which lines are connected to off-hook stations automatically. The majority of these arrangements are not designed to function with key station sets and do not permit manual or automatic line selection. In addition, these arrangements are, in general, cumbersome and expensive additions to the telephone plant.

A few arrangements are presently available in key telephone systems which eliminate the necessity for depressing a pickup key at a call originator's station to select a line. In one such arrangement the caller removes his handset, and after a short delay inserted to allow for key selections, a so-called prime line is automatically connected to the station set.

Accordingly, it is an object in key telephone systems to automatically connect an idle line to a key station set without the necessity for key depressions and in response to an off-hook indication.

It is a further object to furnish an automatic line connection arrangement in a key telephone system which eliminates the necessity for depressing a pickup key but is compatible with manual line selections by subscribers.

It is also an object to automatically connect idle lines to key stations in a manner which assures an equitable distribution of the call traffic on the lines appearing at the station set.

SUMMARY OF THE INVENTION

These and other objects of the invention are achieved in accordance with my preferred embodiment in which program controlled equipment is furnished in a key telephone system for automatically connecting idle lines to key stations thereby obviating the necessity for observing idle-busy states of such lines and for manually depressing keys to select lines. Importantly, as each line is utilized on a call, a bush condition is maintained on the line until substantially all lines at a set have been used, thereby insuring a nearly ideal distribution of the call traffic over all lines. In addition to the foregoing, the automatic connection equipment advantageously does not interfere with manual line selections by a key station subscriber.

The embodiment includes a plurality of functional circuit modules, each embodying separate data processing capabilities and a multiphase system clock which connects to all modules to control system operations. The system clock generates binary encoded instruction signals based on a master program which is stored in the clock. A subroutine of the program controls the automatic connection of idle ones of the lines to off-hook station sets in accordance with an aspect of this invention.

The "first idle line pickup," or FILP, program subroutine follows various other program subroutines in which, for example, station sets are scanned for switchhook status information and button depression activity. The data accumulated during these subroutines is utilized in the FILP subroutine to control the module operations. If an off-hook condition at a station set is detected and it is determined that no line selection has been made at the set, the instructions of the FILP subroutine cause the button code of the leftmost key position to be temporarily stored in a memory associated with the set. The next instruction of the subroutine interrogates the line associated with the stored button code for its idle-busy status. If the line is busy, the next subroutine instruction replaces the stored button code with a button code for the adjacent button position. Another signal is forwarded to the line assigned to this button position to ascertain its idle-busy state. This process is repeated for each button position in search of an idle line.

When an idle line is located, the search for idle lines at remaining (lower numbered) button positions is terminated. Before connecting the idle line to the set, however, instructions in the routine recheck the stored information pertaining to the set requesting service and verify the idle status of the line by a second interrogation. If this last check is verified, subsequent instructions control the establishment of a connection from the idle line to the station set.

In the event none of the tested lines are idle, a subroutine instruction resets the station set memory and stores a no connect code in the memory. This code is compatible with subsequent instruction signals. On the next program cycle the FILP subroutine is reactivated and all lines associated with the station set are again interrogated to ascertain an idle state. This process is repeated cyclically until an idle line is found or until a pickup key is depressed by the subscriber.

A feature of this invention is the provision of program controlled equipment which maintains a busy indication on those lines used on a call until all lines at a station set are used at least once. The busy indications are removed from all lines in response to a conditional program instruction sent near the end of the FILP subroutine. The latter instruction is conditioned on the event that no lines are idle after all button positions have been interrogated.

Another feature of this invention relates to program controlled apparatus which interposes a delay before activating the automatic line connection equipment. During this interval a subscriber can manually choose a line for connection to his set.

Accordingly, it is an aspect of our invention that circuitry in a key telephone system automatically test the idle-busy state of lines appearing at a key station, select an idle line from the tested lines in a prescribed manner, and connect the idle line to the station set in response to the detection of an off-hook condition at the set and without the necessity for depressing a pickup key associated with the idle line.

Advantageously, our invention may be incorporated in the modular key telephone system described in the copending patent application of D. J. H. Knollman and J. L. Simon; Ser. No. 43,812; filed June 5, 1970 and allowed on Feb. 15, 1972.

BRIEF DESCRIPTION OF THE DRAWING

FIG. 10 shows various feature modules;

FIG. 12 shows the manner in which FIGS. 2–7 are to be arranged;

FIG. 13 shows the manner in which FIGS. 8–10 are to be arranged;

FIG. 14 shows the arrangement of FIGS. 1A and 1B, and

GENERAL DESCRIPTION OF THE SYSTEM ARRANGEMENT

Figure 1A:
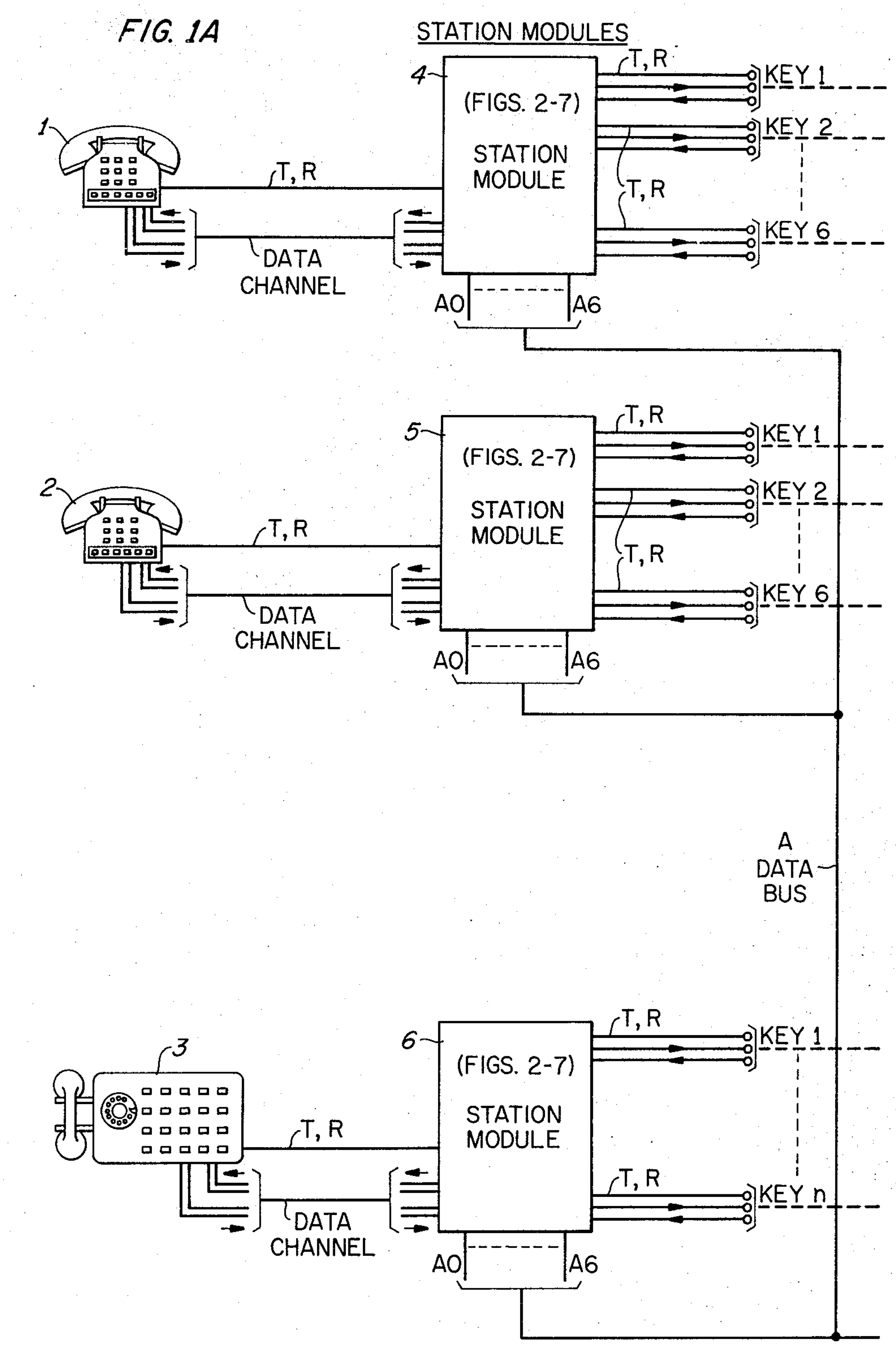
FIGS. 1A and 1B depict a simplified block diagram of one specific illustrative embodiment of the invention and show the manner in which modules may be cross-connected.
Figure 1B:
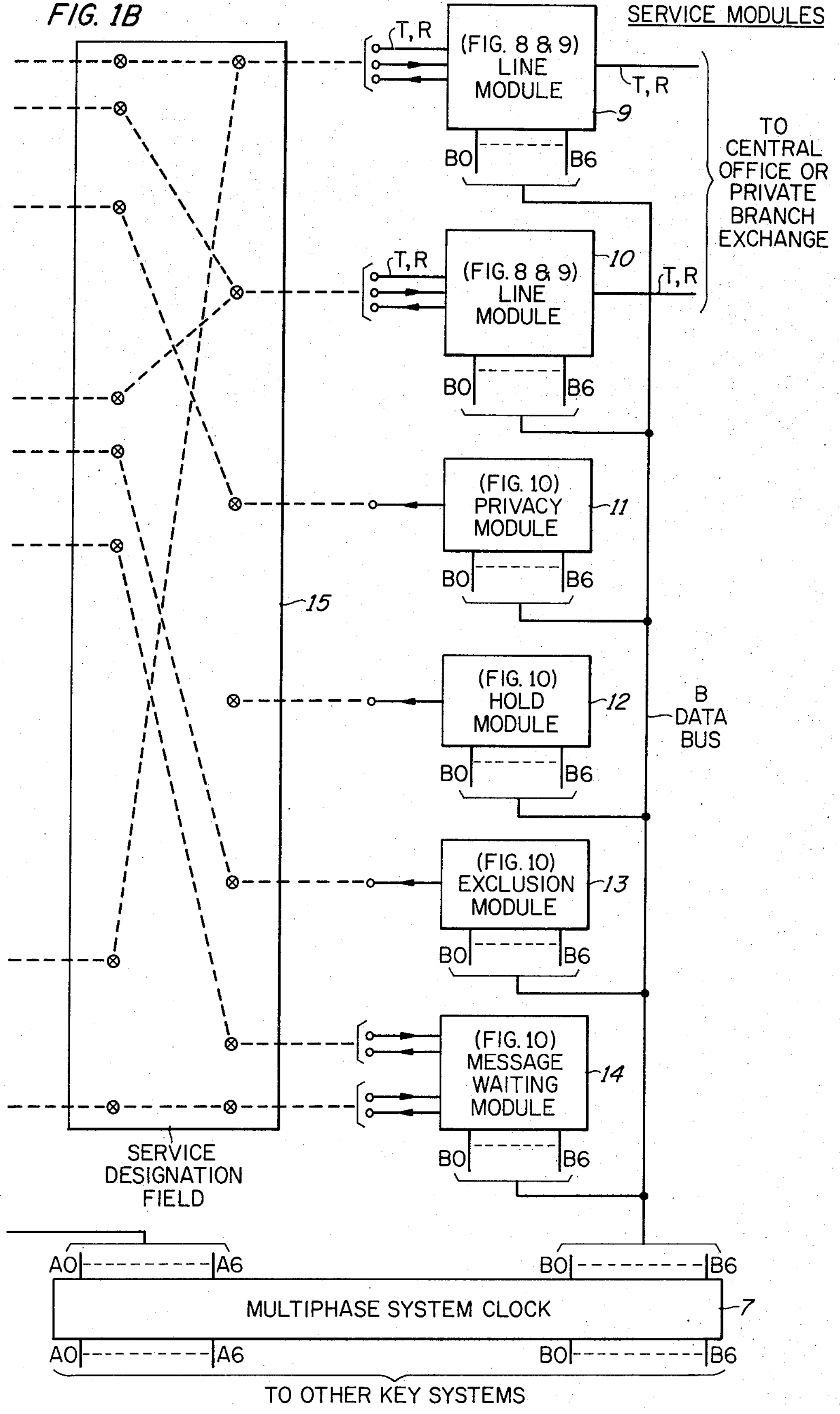

As seen in FIGS. 1A and 1B, the major elements of this embodiment of the invention include station modules 4, 5, and 6 associated with respective station sets 1 and 2 and "call director" set 3; line modules 9 and 10 associated with separate lines from a central office or Private Branch Exchange (PBX); and a service designation field 15 through which modules are interconnected. Various services are provided by service modules such as privacy module 11, hold module 12, exclusion module 13, and message waiting module 14. The whole arrangement is controlled by multi-phase system clock 7 which generates program controlled instruction signals on the "A DATA BUS" and the "B DATA BUS."

In this embodiment of the invention wherein station sets 1 and 2 are each provided with six non-locking push buttons, any one of them can be assigned to a particular line, or feature, module. Referring to station module 4, the following illustrative assignment is shown: buttons 1 and 2 to C.O./PBX lines (modules 9 and 10), and button 6 to the privacy feature (module 11). Station set 2, as may be seen by reference to station module 5 has button 1 assigned to the same line (module 10) as button 2 of set 1, button 2 to the exclusion feature (module 13), and button 6 to the message waiting feature (module 14). Button 1 of set 3 is associated with the same line (module 9) appearing at button 1 of set 1, and button *n* of set 3 controls the message waiting feature (module 14).

Upon closer examination of the service designation field 15, it may be observed that a simplified wiring pattern emerges. Button positions of a station set are associated with particular lines by interconnecting the line module for each of the lines with the associated station module using four wires—two of the wires designated T and R are for the voice transmission and the other two wires shown with arrowheads are for intermodule signalling. To assign a feature operation to a button, a single pair of wires is necessary to cross-connect the button position of the station module with a feature module. It is to be noted that with the exception of the message waiting module 14, only a single feature module, 11–13, is required to serve the entire system and provide the feature service to all station sets.

Station sets 1 and 2, and call director set 3 connect to separate station modules 4, 5, and 6 via a six-wire path. Conductors T and R of that path form a conventional voice path and the remaining two pairs of conductors are for sending and receiving lamps, ringer, button depression and switch-hook status data signals. The circuitry (not shown) of station sets 1 and 2, and of set 3 responds to bipolar signals on the data channels for updating the lamps and ringer indication of the set, converts the received signals and returns to station modules 4, 5, and 6 bipolar encoded signals representing the button and switch-hook status at the set. Power for operating the station set circuitry is supplied over the data channels.

Multi-phase system clock 7 comprises a semi-permanent memory for storing a list of program instruction signals as well as signal sending equipment for one-at-a-time transmission of the stored signals, or words, in a binary encoded format via "A DATA BUS" and "B DATA BUS." The circuitry (not shown) of clock 7 is conventional and may comprise, for example, a drum-type memory, a drum scanner circuit and a signal transmitter coupled to the scanner circuit. Each instruction, or word, comprises seven bits which are forwarded in parallel on conductors AO–A6 and BO–B7 and received at all modules simultaneously.

Considering now the circuitry of station modules 4, 5, and 6 in greater detail, it comprises:

a. a system clock decoder, b. an incoming data register, c. a function calculator,
d. an outgoing data transmitter,
e. a switching network,
f. a switch-hook and time-out circuit,
g. a button code and memory register, and
h. a service input/output intermodule signal sending an receiving circuit.

Each of the above circuits may be combined and controlled to operate in any one of various sequences by program instructions on the "A DATA BUS." Moreover, the circuit operations performed by each individual circuit may be altered and directed by the same instructions. One of the most significant circuits of the station module is the function calculator which expands the operational range of station modules 4, 5, and 6 in response to program signals. The calculator is connected to eight internal circuit variables (circuit conditions); and upon appropriate instructions, it can serially select a series of these variables and perform combinatorial logic thereon. These variables can be derived from connected service modules to expand the possible circuit conditions which can be logically combined. As a result, many operations can be facilely programmed and new service conditions accommodated by simple program changes.

Line modules also respond to program instruction signals on the "B DATA BUS" for updating supervisory, hold and "A" lead information. This module is equipped with various timing devices for timing the interval between ringing signal bursts, the interval after receipt of the first ringing signal burst (delayed ringing), and the interval following receipt of an on-hook signal while on hold for controlling the release of the line module.

Feature modules, such as the Privacy, Hold and Exclusion Modules 11, 12, and 13, contain coded gates which control the transmission of a signal to connected station modules upon receipt of a special program instruction. The transmitted signal is sent at various times during the program and its interpretation is dependent upon the subroutine group of instructions of which the special program instruction is a part.

GENERAL DESCRIPTION OF THE FILP ARRANGEMENT

All station modules respond to the instruction signals on data bus A to combine logically data signals received previously from their associated station sets. The conditions, or events, which are combined are: off-hook status ($Y_1$, $Y_2$), state of station module network (NI) and state of scanning equipment (MISM). Depending upon the output of a function calculator which combines these signals, the station module begins to interrogate the lines assigned to button positions at each station in descending order. This interrogation is carried on independently and concurrently at each station module under control of conditional instructions on bus A. As each station module locates an idle line, the independently controlled interrogation at the module is terminated. After the interrogation cycle is complete, station modules which have not located an idle line are instructed to forward a signal to all lines associated with the module to release any artificial busy conditions set up for traffic control reasons. This aspect is discussed in detail subsequently.

Before connections are actually made it is necessary to recheck each of the idle lines to assure that they have not been seized simultaneously by two station modules and to verify that the subscriber has not returned to the on-hook condition. If a double connection exists, the conditional program instructions which follow release the line at both station modules. In this manner the double connection problem is alleviated. Following the second check, instructions are forwarded to all station modules directing idle line connections to be made. Station modules which do not locate an idle line will repeat the interrogation cycle on the next program instruction cycle.

Facilities are disclosed for delaying the activation of the FILP subroutine so as to allow time for a manual selection of a line. This apparatus and the associate program instruction format are optional. The apparatus comprises basically a timer actuated each time a subscriber off-hook indication is detected. Instructions in the FILP subroutine combine logically the output of timer in the function calculator with the events NI and MISM data mentioned above before entering the line interrogation cycle.

Each line module associated with a line has a memory element which is set each time the line is seized. This element controls the busy-idle indication sent to the station module during the interrogation cycle. Uniquely, this element is not reset automatically as the line becomes idle. It is only reset if the line is idle when a signal is received from a connected station module at a particular time during the subroutine. Since the latter signal is not sent except when all lines have been tested busy, this insures full usage of the lines. It is expected that a line multipled over many key stations will be assigned to different button positions at those stations to distribute the call traffic and to minimize the probability of simultaneous selections discussed above.

DISCRETE LOGIC CIRCUITS

The presently disclosed system makes extensive use of Diode Transistor Logic (DTL) and Resistor Transistor Logic (RTL) in which single transistor stages are used as an inverter, and AND gate, or an OR gate, depending upon the nature of the input signals applied thereto and the functions to be performed by this stage. FIGS. 11A, 11B, 11C and 11D disclose the details and respective symbols for each logic gate and flip-flop employed in the system.

Figure 11A:
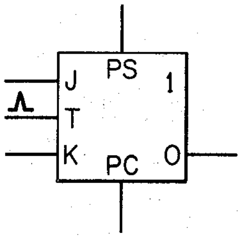
FIGS. 11A to 11H describe the drawing conventions for gates, multiplexers, decoders, and flip-flops, together with truth tables therefor.

The truth table for a J-K type flip-flop is shown in FIG. 11A. Positive going transient pulses on terminal T, referred to ordinarily as toggle pulses, activate the flip-flop into different states depending upon the level of the signals on terminals J and K. If the state of terminals J and K are one ("1") when the toggle voltage is applied to terminal T, the flip-flop switches so as to form the complement of the previously stored signal. The latter is indicated in the truth table as a $\overline{Q}$. The presence of zeroes at terminals J and K concurrent with a toggle voltage at terminal T causes the flip-flop to remain in its original state. Terminals PS and PC, asynchronous inputs, respectively set and clear the flip-flop to establish initial states. Additional details of the operation of a J-K flip-flop may be obtained by reference to *Logic Design of Digital Computers*, by Montgomery Phister, Jr., page 128 et seq.

Figure 11B:
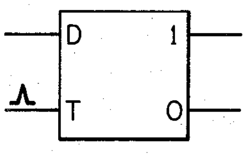
Figure 11C:
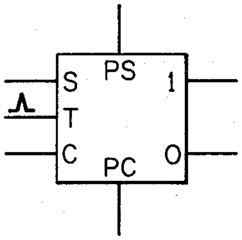

A D type flip-flop is activated by toggle pulses at terminal T to produce the outputs at terminal 1 indicated in the truth table of FIG. 11B. It may be seen the level at terminal D is reflected without inversion at terminal 1 and complemented at terminal O. See the aforementioned text by Montgomery Phister, Jr., page 126.

A S-C flip-flop logically functions in the same manner as a J-K flip-flop with one important difference. If zeroes appear at terminals S and C concurrent with a toggle voltage at terminal T, the complement of the previously stored signal in the flip-flop is formed at its output terminals 0 and 1. From reference to the truth table in FIG. 11C this may be readily seen.

Figure 11D:
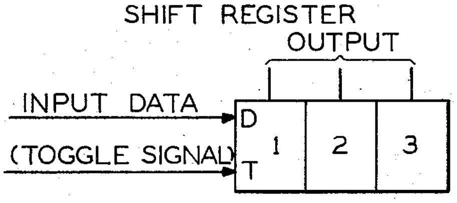
Figure 11E:
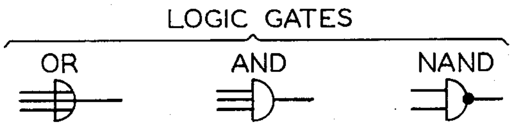

Symbols for AND, NAND, and OR gates are shown in FIG. 11E. Truth tables for these gates are disclosed in the Phister text.

Figure 11F:
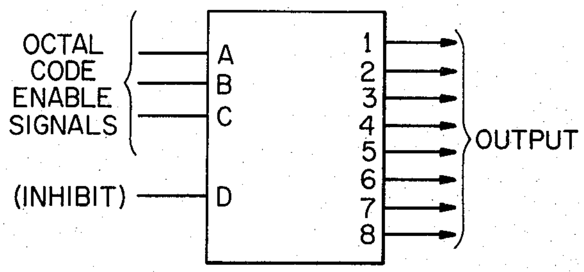
Figure 11G:
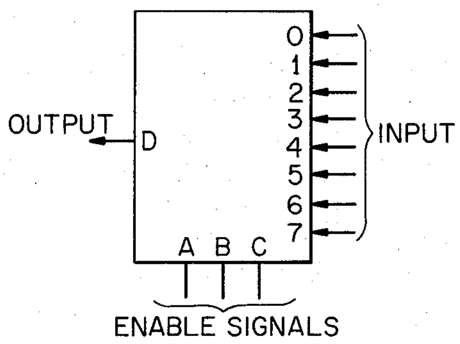
Figure 11H:
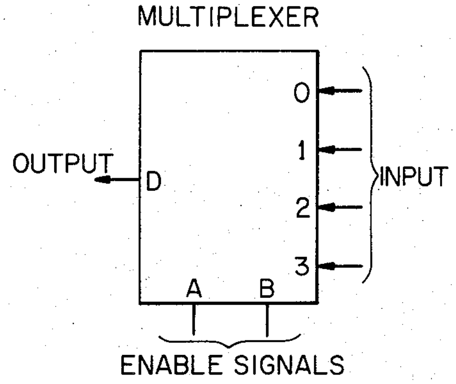

A multiplexer, FIG. 11G, is a device controlled by an octal code at its terminals A, B, and C for connecting any one of its terminals 0–7 to terminal D. The relationship between the octal code, in binary form, and the terminal connected to terminal D is shown in the accompanying table. FIG. 11H discloses the symbol and truth table for a binary code controlled multiplexer.

A shift register, such as the one shown in FIG. 11D, stores binary coded signals. The binary signals appearing at terminal D are "shifted" into the cell marked "1," one at a time, for each positive going pulse appearing at terminal T. As each new signal is introduced into cell 1, the previously stored binary signal is shifted into cell 2 and from thence into cell 3. The vertical lines shown connected to cells 1–3 represent the outputs of each cell.

An Octal Decoder, FIG. 11F, forms a "1" signal at its output terminal 1–8 in accordance with octal encoded signals at terminals A, B, C, and D. In the idle state, outputs at terminals 1–8 are zero; and upon the occurrence of a predetermined octal binary code at terminals A, B, and C, one of the terminals 1–8 is high ("1"). Terminal D is effectively used for inhibiting signals. The presence of a one at terminal D raises the octal code equivalent above the number 8, and thus there is no output.

Insofar as it has been possible, one ("1") signals are used to enable or to activate circuits. When it is necessary to form the inversion or complement of the signal, the symbolic convention used is a dot. This dot may be shown at the intersection of an input lead and gate, or output lead and gate. For example, in FIG. 3, AND gate 97 has an inversion symbol at its output; thus a one signal at its input will produce a zero signal at the input of the succeeding gate 96. Inversion symbols are also used on decoders, multiplexers, and shift registers; and when so used, their meaning is consistent with the above description.

DETAILED DESCRIPTION

It is considered that the basic principles of the invention can best be understood by considering in some detail initially, basic concepts of the program controlled key telephone system embodying the apparatus of the invention. Thus there is presented a detailed description, module by module, of the various logic circuits contained in each separate module. Next, the basic program instruction signals of the master program are considered in light of the circuit actions that those signals control. Following this, there is presented a complete program for performing the basic operations associated with the key telephone system. Subroutine K of this program sets forth the program instructions which control the modules to provide first idle line pickup service.

STATION MODULE (FIGS. 2–7)

This module is the focal point for operations within the system because it provides an interface between a telephone set and various service modules including line modules. The majority of the logic control circuitry which may be programmed to operate in a variety of different ways is contained within this module.

Figure 2:
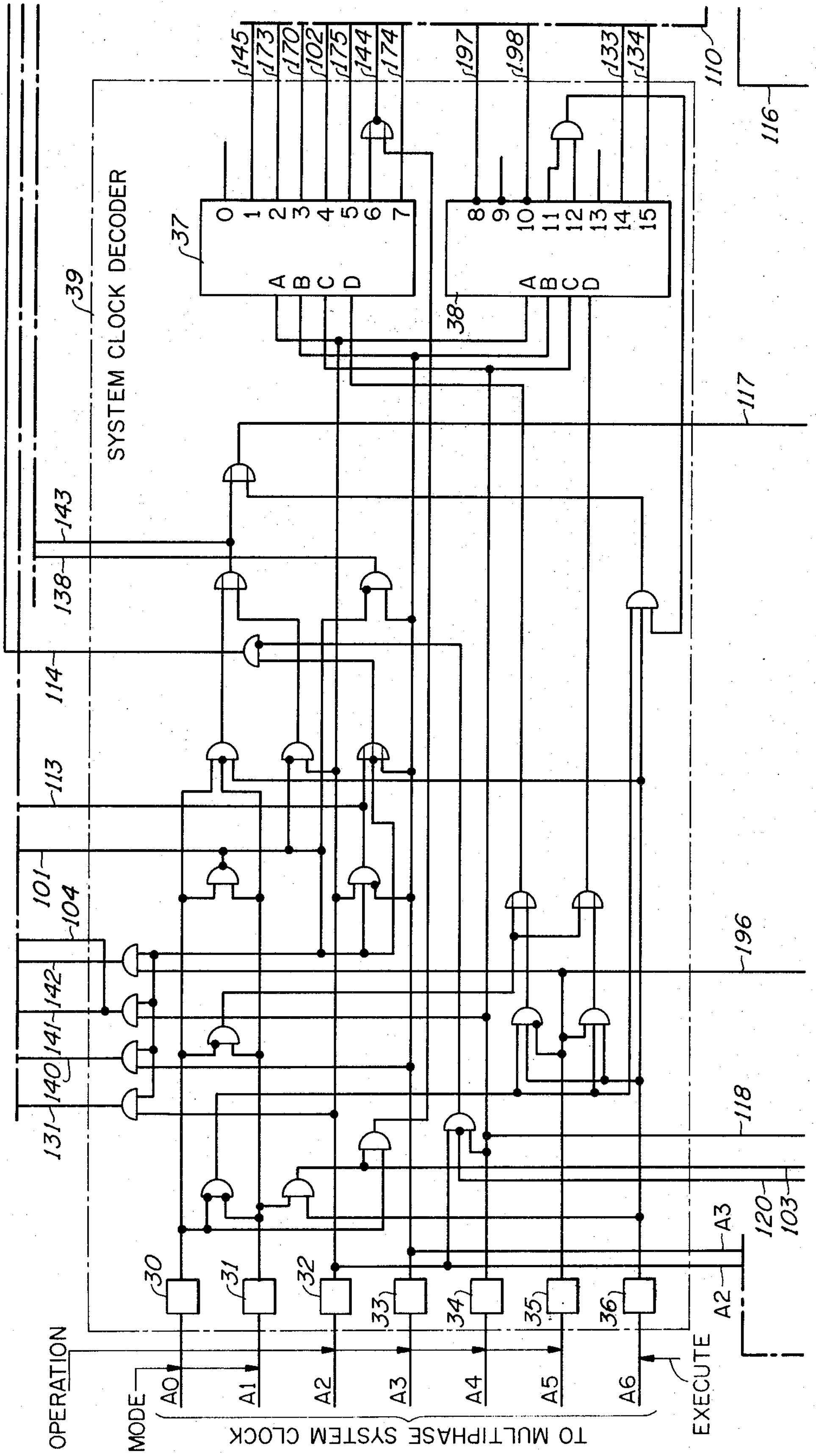
FIG. 2 shows the system clock decoder for a station module.

The station module, like every other module in the system, connects to a signal bus ("A" bus) to receive instruction signals from the multi-phase system clock 7. With reference to FIG. 2, seven wires comprising the "A" bus are depicted on the left-hand side of the drawing and are labeled AO–A6.

The first sub-circuit of the station module which we will consider is the system clock decoder 39 shown entirely in FIG. 2. It functions to decode in a predetermined manner the binary data on leads AO–A6 for controlling local module circuits. The main purpose of decoder 39 is to reduce the number of leads in the "A" bus. Buffer circuits 30–36, each including a line isolator and amplifier, are inserted between the "A" bus connection and the logic gates of decoder 39. The isolator, which may typically be a diode or transistor junction, prevents false signals generated within the module circuitry from becoming impressed on the "A" bus leads and thereby rendering all modules tied in common to this same bus inoperative. The amplifier also increases the signal level of the voltage applied on leads AO–A6.

The system decoder essentially comprising AND gates wired together in a particular pattern to translate received word signals on leads AO–A6 into signals on various leads shown exiting at the top, right-side and bottom of FIG. 2. Octal Decoders 37 and 38 are controlled by clock signals applied to their respective terminals A, B, and C for generating a signal on one of the leads in cable 110. The respective terminals D of decoders 37 and 38 always contain the logical compliment with respect to each other of the derived signals. Thus, in effect, when decoder 37 is inhibited, decoder 38 is enabled and vice-versa.

Figure 4:
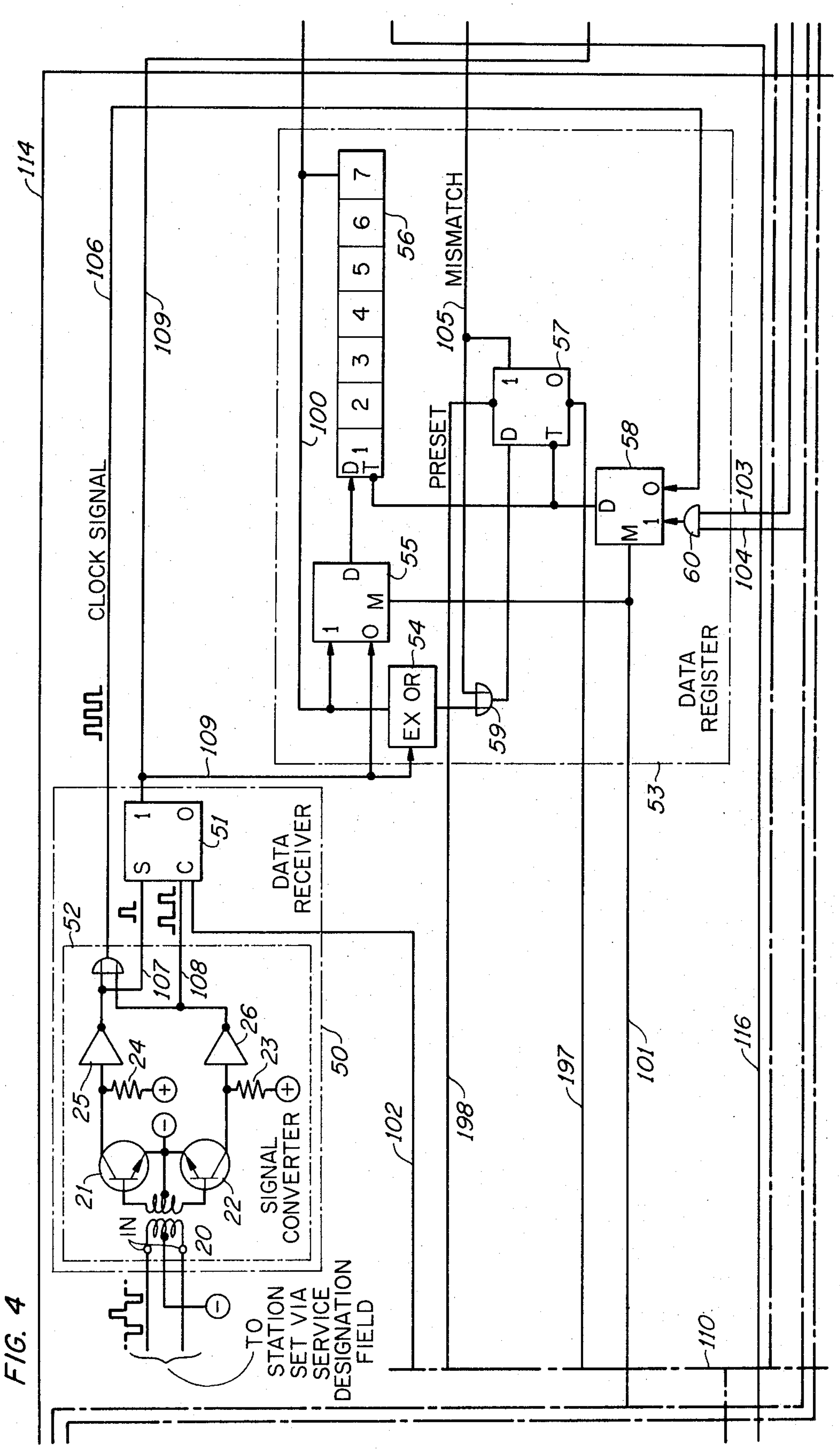
FIG. 4 shows a signal receiver and store for data signals forwarded by a station set.

Referring to FIG. 4, it depicts a Data Receiver 50 and a Data Register 53 for detecting and recording information transmitted from the station set. Station sets transmit bipolar pulses (a sample shown in the figure) which are received at terminal IN of converter 52. Converter 52 generates a clock signal derived from the transmitted bipolar signals, which clock signal is forwarded on lead 106 to Data Register 53 for synchronizing the circuit operations with the incoming pulses. Converter 52 also converts and separates the bipolar pulses into separate unipolar pulses shifting between level O (ground) and level 1 (positive level). The separated signals are connected via leads 107 and 108 to terminals S and C (set and reset) of flip-flop 51. In this manner, each negative going pulse resets and each positive going pulse sets the state of flip-flop 51.

The incoming bipolar pulses are received by a transformer 20 which couples the signal to gate circuitry comprising transistors 21 and 22. Transistor 21 is conducting on positive pulses and transistor 22 is conducting on negative pulses.

Figure 5:
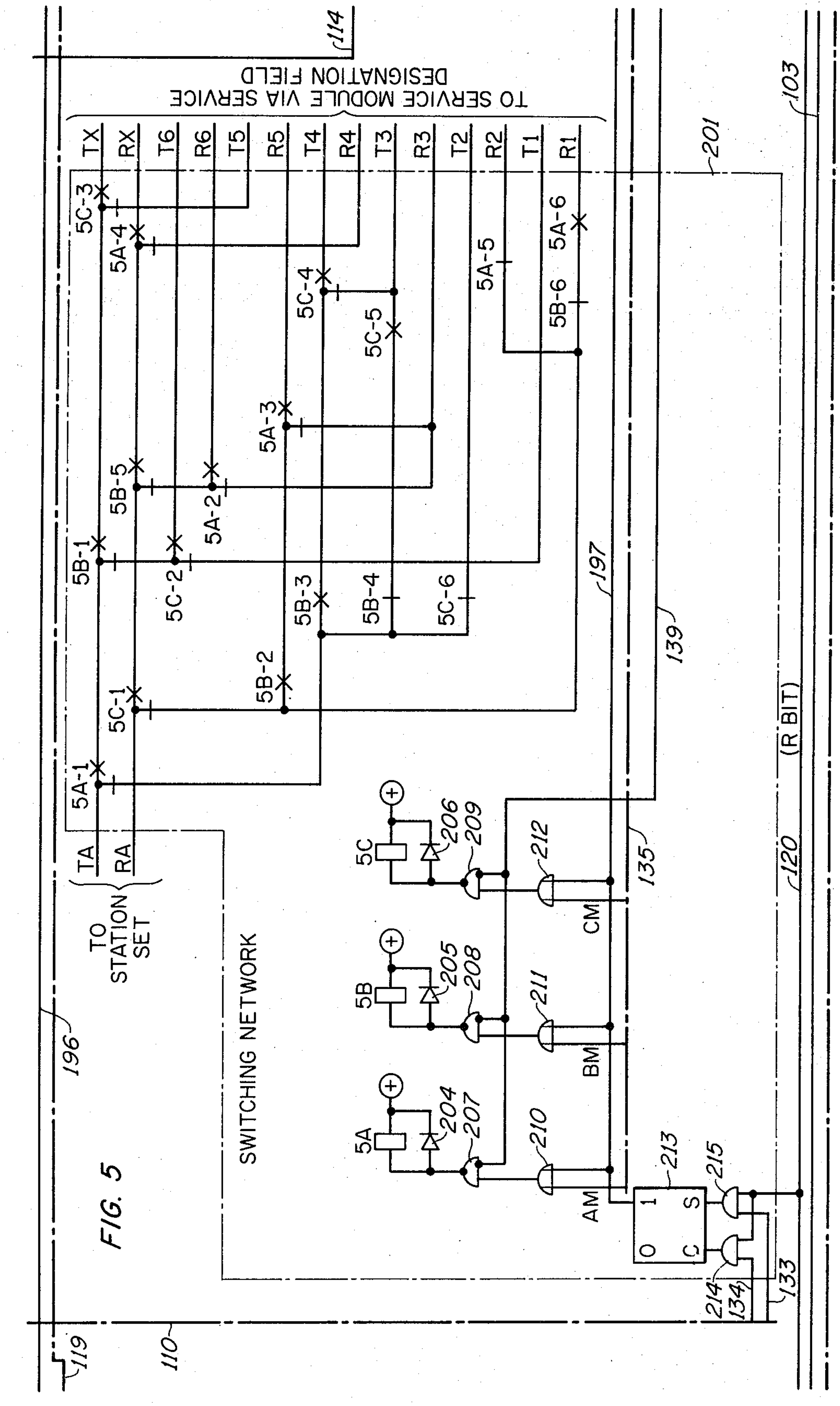
FIG. 5 shows a switching network for connecting a line from the station set to any cross-connected line module.

Before discussing in greater detail the operations of the remaining circuits disclosed in FIG. 5, it is opportune to first consider the nature of the signals forwarded by the station set. The station set forwards a seven-bit word which indicates the status of the switch hook and six buttons located in the base of the set. The rightmost bit of the transmitted word corresponds to the "switch hook bit." The received data is recorded in the same order as transmitted, in data register 53. For purposes of this present illustration, it will be assumed that the data is transmitted in the following order: Switch hook bit, status of button 6, button 5, button 4, button 3, button 2, and button 1.

Figure 6:
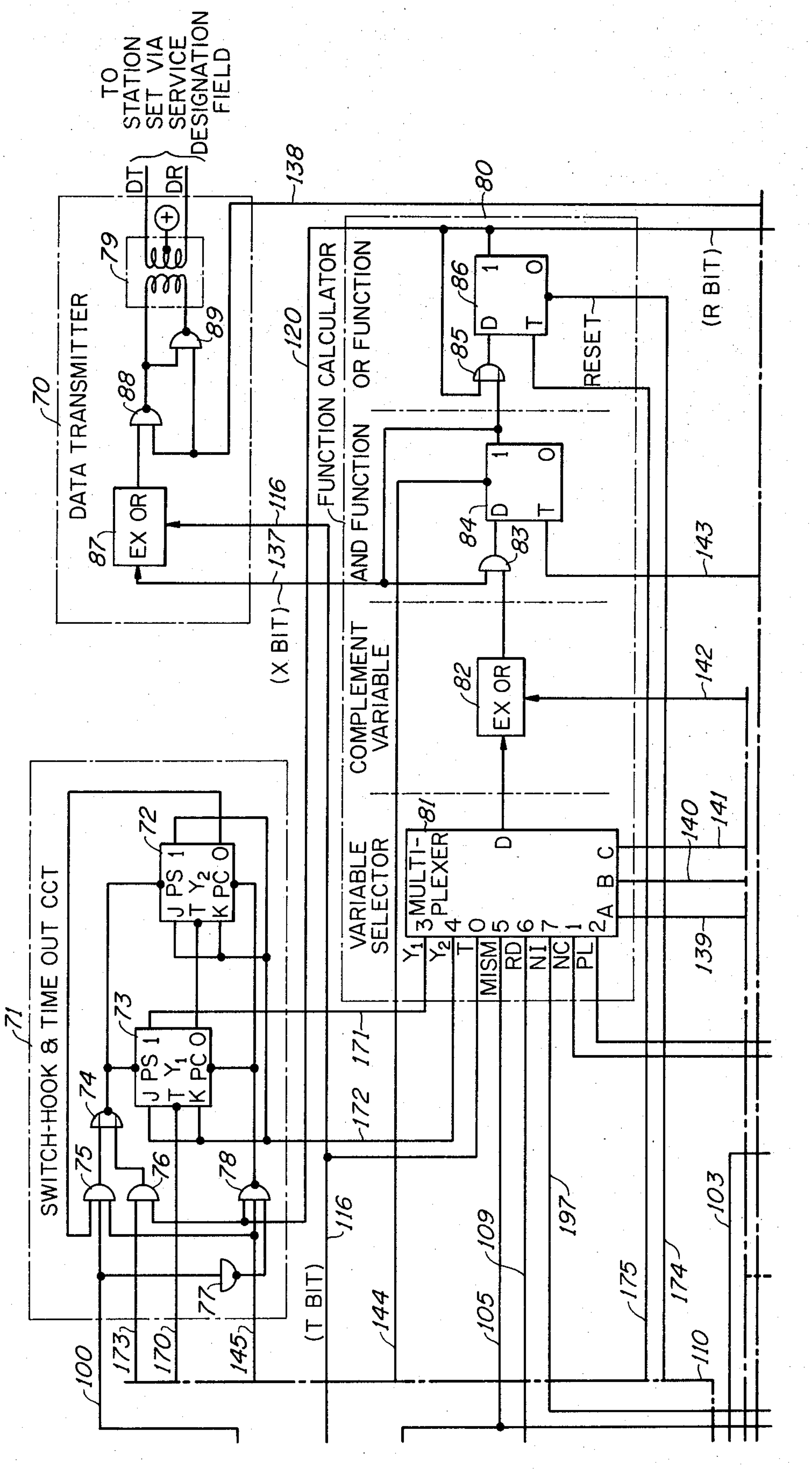
FIG. 6 shows a switch-hook time-out circuit, a data transmitter and the function calculator.

The center tap of the input winding of transformer 20 is connected to negative battery. Referring momentarily to FIG. 6 and therein to Data Transmitter 70, it may be seen that center tap of transformer 79 having windings connecting to the station set, connects to positive battery. In this manner, the station set equipment is powered over the same channels as signals are transmitted and received. Due to the winding orientation of transformers 20 and 79, the flux created by the DC current flow is cancelled out in the primary windings. Thus the transformer does not saturate and the signals transmitted are not distorted.

Upon the receipt of appropriate program instruction signals, the circuitry of Data Receiver 50 and Data Register 53 are combined logically to perform two separate operations. In the first operation, data transmitted by the station set is converted into unipolar information by receiver 50 and compared in register 53 against the information previously transmitted by the station set and presently recorded in shift register 56. This operation is performed to determine a change of state of any button at the station set. The second operation which can be performed by the combined circuitry of receiver 50 and register 53 is the location of a 1 bit stored in register 56. This operation is performed when it is desired to identify the specific button having a change of state.

As noted previously, on each scan the station set forwards a seven-bit word denoting the status of the switch hook and the six buttons at the set. Let us assume that there is at present stored in shift register 56 a seven bit signal which comprises all 0s. Recall that the receipt of a "1" bit signal denotes a button depression; and if it is received at the beginning of the bit stream, it denotes an off-hook state. Accordingly, the assumed state, all 0s, indicates an idle condition of all buttons and an on-hook state of the switch hook. The output (terminal "1") of flip-flop 51 may be coupled to terminal D of register 56 by multiplexer 55.

When it is desired to receive station set signals and compare those signals against the signals stored in register 56, the system program decoded by decoder 39 provides a signal on lead 101 such that multiplexers 55 and 58 are toggled to 0. Thus it may be seen that synchronizing clock pulses on lead 106 are coupled to register 56 resulting in the shifting of the data from left to right, or from cells 1 to 7. As the data in register 56 shifts, each stored unit, in the present example 0s, is coupled to lead 100 and to Exclusive OR gate 54. Concurrently, the received data, converted to unipolar information, is coupled by a lead 109 to gate 54 and therein compared. When a mismatch, or difference, between the compared signals occurs, gate 54 forwards a signal via OR gate 59 to set flip-flop 57. The signals on lead 109 are also coupled via multiplexer 55 to register 56 for storage therein. It is to be noted that the registration of a mismatch in flip-flop 57 and the shifting of the register information in register 56 are controlled by the derived clock signals which toggle those devices. Thus as the priorly stored information in register 56 is shifted out of register 56 and connected to lead 100, the incoming data is stored in its place.

The circuitry of Data Receiver 50 and Data Register 53, as previously remarked, can also be used to locate the bit position of a "1" stored in register 56. It will be recalled that a "1" corresponds to the off-hook state of a switch hook or a button depression signal. To accomplish this operation, a program instruction manifest by a particular word appearing on leads AO–A6 controls a signal level in FIG. 4 of leads 101, 102, and 104. The signal level on lead 101 toggles multiplexers 55 and 58 to a "1." In addition, the incoming data which may or may not be transmitted by a station set at the time that this operation is initiated, is blanked, or set to 0, by the signal level on lead 102 which maintains flip-flop 51 in the reset, clear, state. Setting the incoming data to zero is necessary to prevent the unwanted input signals from interfering with this operation.

The search for the one bit in a word stored in register 56 is initiated by a shift clock pulse which is continuously available on lead 103 and by an enabling signal on lead 104. The shift clock signals are comparable to those of the derived clock signals priorly discussed on lead 106. They are gated by multiplexer 58 into the register 56 causing the stored information to be coupled onto lead 100. Since this shifting process is destructive, the original signals are recirculated through multiplexer 55 and returned for storage in register 56. As flip-flop 51 is clamped effectively in a reset state, a 0 level signal appears on lead 109 and that signal is compared against the information on lead 100 by "Exclusive OR" gate 54. Thus a 1 bit will be detected as a mismatch and gate 54 will transmit a signal via gate 59 and reset flip-flop 57.

Figure 7:
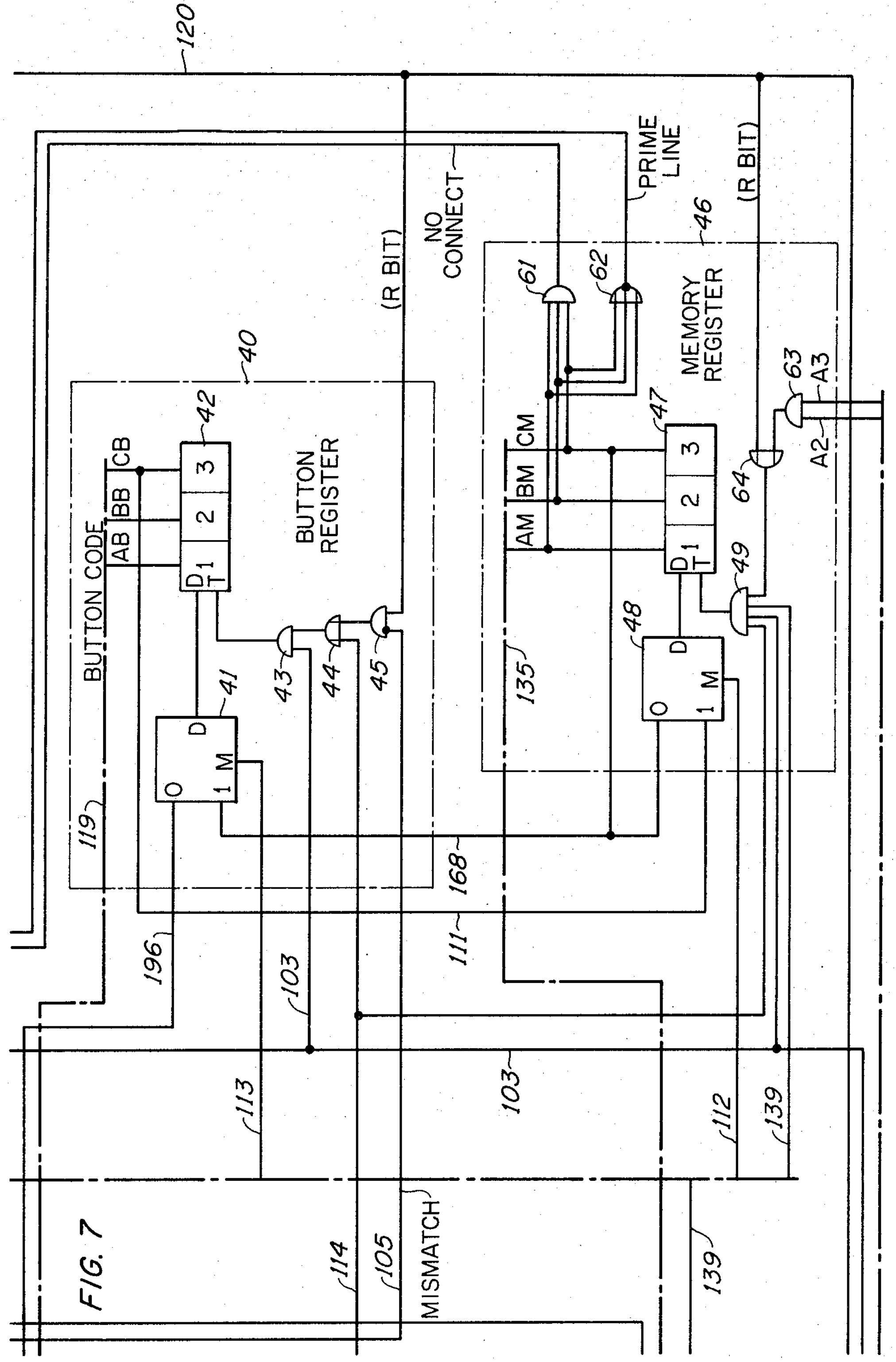
FIG. 7 shows a button code register and a memory register.

The foregiong operation is ordinarily coordinated with a separate circuit action carried on in the button register 40 shown in FIG. 7. As the bit information is shifted one at a time out of register 56, three digit binary codes are circulated in register 42 of button register 40. When a mismatch is detected, a signal appears on lead 105 which may be traced from terminal 1 of flip-flop 57, FIG. 4, to gate 45 of register 40. This signal halts the shift register operation at the last code registered in register 42 before a mismatch is detected.

Each station set button is identified by a unique binary code as follows:

| Button | Code Word |
|---|---|
| 1 | 100 |
| 2 | 000 (Prime Line) |
| 3 | 001 |
| 4 | 011 |
| 5 | 110 |
| 6 | 101 |
| EXP. (N.C.) | 111 |
| VACANT | 010 |

The code associated with button 2 is 000. It also corresponds to the state of the module circuitry during a power failure so that, as will be explained in more detail hereinafter, the prime line is automatically connected to a line module during such a failure.

Turning next to FIG. 7, it discloses two 3-bit shift register arrangements which are essentially used in the determination and storage of codes relating to station set buttons. The data, or button number, may be serially shifted between button register 40 and memory register 46. Information is shifted from button register 40 to register 46 under control of multiplexer 48 and the signal level on leads 112, 113, 114 and 139. The signal levels on these leads are established by decoder 39 in accordance with a program instruction signal received on leads AO–A6. Gate 45 of Register 40 is turned on by the presence of "0" signal, a mismatch signal, on lead 105 and in succession, OR gate 44 and gate 43 is enabled. Gate 44 is enabled by the combination of "1" signal at the output of gate 45 and a "1" signal on lead 114. The latter signal is derived from the program instruction. Lead 103 connects to gate 43 and conveys clock pulses. Thus the pulsing output of gate 43 acts as a "toggle" signal and the information in register 42 is shifted bit by bit from cell 1 to 3. The output of cell 3 is coupled via lead 111 and multiplexer 48, and recorded in register 47. It is to be noted that multiplexer 48 is switched by the signal level on lead 112 so that terminal 1 is internally connected to terminal D. Concurrently, terminal T of register 47 is pulsed by the clock pulses on lead 103 via gate 49 for shifting register 47 and recording the output of register 42.

It may be appreciated that the information stored in register 47 can be circulated; i.e., output and input of register connected together, in a manner similar to the operation previously described for shift register 56 of Data Register 53. Multiplexer 48, if toggled to 0, in accordance with an instruction signal on lead 112, couples the output of the right-most cell, cell 3, of shift register 47 to the left-most cell, cell 1, of that same register. Application of toggle signals at terminal T circulates the stored information bit by bit.

While the information stored in register 47 is being circulated, it can also be recorded in register 42 of Button Register 40. If multiplexer 41 is switched by a signal on lead 113 so that internally terminal 1 and D are interconnected, the circulated pulses are conveyed via lead 168 and the Multiplexer 41 to terminal D of register 42. The concurrent application of toggle signals at terminal T shifts the circulated data and stores it bit by bit.

Figure 3:
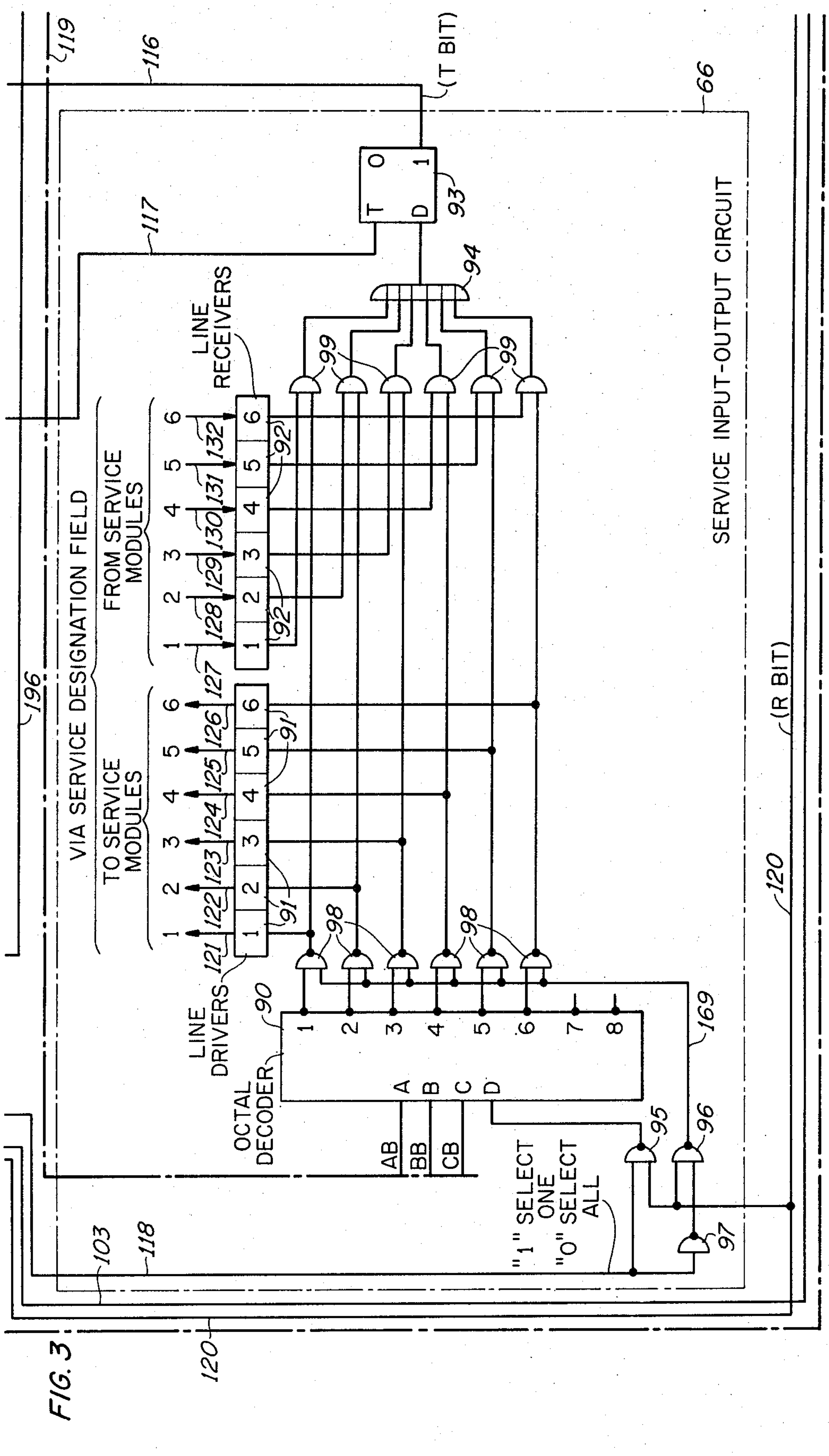
FIG. 3 shows a circuit for controlling the exchange of intermodule signals between a station module and connected service modules.

The service input-output circuit 66 shown in FIG. 3 functions to send and receive intermodule signals via leads 121–132. As mentioned previously, station set buttons 1–6 may be associated with any service designation field. A review of FIGS. 1A and 1B will assist in recalling how these cross-connections are made. Cross-connections are made between conductors 121–132 shown at the top center of FIG. 3 and service modules. For each service module associated with a particular station set button, two wires must be connected from the station module to the service module. In FIG. 3, the numbers 1–6 in line drivers 91 and line receivers 92 correspond to the button position of the station set. If, for example, it is desired to assign button 2 to a particular service, conductors 122 (outgoing data) and 128 (incoming data) are connected to the service module capable of performing the service.

The particular interconnected module with which the station module communicates via the circuit of FIG. 3 is controlled by the button code stored in Button Register 40 (FIG. 7) and also by execute signals derived by Decoder 39 from program instruction signals on leads AO–A6 (FIG. 2). Signals representative of a stored button code are forwarded via cable 119 over the leads of that cable which are designated AB, BB, and CB.

The binary code assigned to each button has been selected so that the storage of the button code corresponding to station button No. 1 in shift register 42 and the recirculating of the cell 3 binary bit will cause the generation of all button codes. Importantly, these codes will be generated in succession starting with button No. 1 and ending with button No. 6. Thus when it is necessary to transmit data to the station set, a program sequence is initiated whereby the button register 40 transmits facilely and in serial form, control signals to circuit 66 for interrogating one at a time each service module associated with each button.

In accordance with a program instruction signal, conductor 118 shown to the left-hand side of FIG. 3 conveys a "1" or "0" bit. A "1" bit controls circuit 66 so that intermodule signals are exchanged only with one service module as determined by the code stored in Button Register 40. If a "0" bit occurs on conductor 118, signals are exchanged concurrently with all cross-connected service modules. The importance of these operations will be more apparent from a consideration of programs and their functions. For purposes of the ensuing discussion, let it be assumed that the signal level on conductor 120 (R bit) does not inhibit the operation of gates 95 and 96.

If a "1" bit is assumed to be present on lead 118, the respective output of Inverter Gate 97 and NAND gate 96 is a "0" and "1." One of the NAND gates 98 connecting to terminals 1–6 of decoder 90 can therefore be enabled by a "1" signal, inverted to a "0," at any of such terminals. Decoder 90 decodes the octal signals on leads AB, BB, and CB into a one-out-of *n* code signal which is applied to one of the terminals 1–6. The enabled one of the gates 98 signals with a "1," one of the line drivers 91 and one of AND gates 99. Having enabled one of the gates 99, an intermodule signal received via the associated of the line receivers 92 is coupled to OR gate 94 and stored in flip-flop 93, "T bit" flip-flop. It should be noted that a toggle pulse on lead 117 is required to store signals in T bit flip-flop 93. This pulse is controlled through program instructions.

When it is desired to send and receive intermodule signals simultaneously over all intermodule signal channels, decoder 90 is inhibited by a "1" signal at terminal D. It will be recalled that a "0" signal is conveyed on conductor 118 to initiate this operation, and it is coupled to inhibit decoder 90 via NAND gate 95. The outputs at terminals 1–6 of decoder 90 are therefore all "0," inverted to "1"'s.

The "0" signal on lead 118 also produces a "0" signal on lead 169 via gates 97 and 96. Thus the inputs to all gates 98 from decoder 90 are "1"'s and their outputs after inversion are "1"'s. In this mode all received intermodule signals are logically combined in OR gate 94 and the output is stored in flip-flop 93.

The intermodule signalling arrangement of FIG. 4 has a more meaningful significance when it is realized that intermodule signals are exchanged at prescribed times during a program sequence. Thus the fact that such a signal exchange has occurred is significant and meaningful only if the program sequence being run at the time of the exchange is considered. An example of the utilization of intermodule signals in coordination with program instructions may demonstrate the versatility of the signalling arrangement. It may be noticed that station modules do not have memory devices for registering the various types of service modules to which they are cross-connected. When such information is required, a special program sequence is initiated and instructions are transmitted to all modules requesting that all modules of a certain type transmit intermodule signals. Station modules, upon receipt of the same instruction signal, arrange the input-output circuit of FIG. 3 to look at particular service module via line receivers 92 to ascertain the transmission of an intermodule signal in accordance with the program request. Failing to receive a signal at that time indicates that the interrogated service module is not a particular service module type. This is but one example of many examples of the use of the signalling arrangement in FIG. 3 which will be more fully appreciated from the ensuing discussion and from particular programs for operating the system.

The circuits, some of which are shown as rectangular blocks in FIG. 3, are conventional. Line drivers 91 and line receivers 92 function to isolate the cross-connect wiring of the service designation field which, in many instances, is common to other modules, from trouble conditions within the station module. These circuits, in their simplest form, may consist of diodes or, if isolation as well as amplification is required, they may consist of single stage transistor logic gates.

A switching network for selectively connecting the transmission path of the station set to the transmission path of a cross-connected line module is depicted in FIG. 5. In the system, it is preferred to separate the intermodule voice communication path from intermodule data transmission paths and accordingly additional cross-connections are required when a line module is associated with a button key of the station set. The leads which must be cross-connected are shown to the right-hand side of FIG. 5. Leads T1 and R1 correspond to button position 1, leads T2 and R2 to button position 2, etc. Note that where a particular button is associated with service modules other than line modules, cross-connections from the T- R- leads are not required.

A particular network path through switching network 201 is established under control of the button code stored in memory register 46 (FIG. 7) and execute signals on conductors 133 and 139 (FIG. 5). The latter signals are derived by Decoder 39 (FIG. 2) from particular program instruction signals on leads AO–A6. In particular, leads A, B, and CM of cable 135 shown in FIG. 7 connect the code stored in register 47 to respective gates 210, 211, and 212 in FIG. 5. Depending on the stored code none, one, or more of the gates 210, 211, and 212 will be enabled. For the present time, let us disregard the possibility of an inhibit signal on conductor 120 (R bit) which signal sets flip-flop 213 and, in turn, the output (term. 1) of flip-flop 213 provides inhibit signals (blocking signals) to gates 210, 211, and 212. In accordance with the code received, gates 207, 208, and 209, as well as relays 5A, 5B, and 5C are respectively enabled and operated. It may be noticed that the operation of gates 207, 208, and 209 can be inhibited by an appropriate signal on conductor 139, which signal occurs ordinarily only during the time information is being shifted into or out of register 46 in order to prevent establishment of premature or false network connections. Flip-flop 213 may be set by a signal on conductor 133 and therefore the network may be blocked in accordance with a program instruction. In addition, a signal on lead 134 can clear flip-flop 213 to remove a blocking condition under control of a program instruction.

Assuming for illustrative purposes that the code 001, corresponding to button 3, is stored in register 46, accordingly, the signal on leads AM and BM are low, while the signal on lead CM is high. Thus only gates 212 and 209 are enabled and only relay 5C operates. A network path can therefore be traced from leads TA and RA to the respective conductors T3 and R3 are follows: Beginning at lead TA, the first path includes break contact of transfer contact 5A–1, break contact 5B–4, and make contact 5C–5. The second path beginning at lead RA includes the make contact of transfer contact 5C–1, and break contacts of transfer contacts 5B–5 and 5A–2.

FIG. 6 depicts three important sub-circuits of the station module. They are Switch-Hook Time Out Circuit 71, Data Transmitter 70, and Function Calculator 80. Circuit 71 stores the state of the station set switch-hook and differentiates switch-hook flashes (on-hook for less than 5 seconds) from permanent on-hook conditions. Circuit 71 also functions under control of program instructions to preselect the prime line (associated with button 2) prior to going off-hook or to reset network 201 (FIG. 5) to the prime line after a call is terminated and the caller has remained on-hook for at least 5 seconds. The switch-hook state information is conveyed via conductor 100 which couples register 56 (FIG. 4) to gates 75 and 77. Flip-flops 73 and 72 sequentially store the switch-hook information which is transferred between the flip-flops and timed in accordance with clock signals generated by the program instruction.

Circuit 71 functions to determine when the subscriber has remained on-hook for more than 5 seconds. Flip-flops 73 and 72 are respectively reset during the time the subscriber is off-hook. When an on-hook condition occurs, program originated signals sequence flip-flops 73 and 72 through various states counting the number of clock pulses on conductor 170, which pulses are separated by 5 seconds. Let us assume that the signal level on lead 120, R bit, is a one. An on-hook signal is designated by the presence of a zero level signal on conductor 100. Upon the receipt of a signal derived from program instructions on conductor 145, flip-flops 73 and 72 are set. The two successive pulses on conductor 170 thereafter toggle flip-flops 73 and 72 until their respective states are one and zero (set and reset). The following chart indicates the successive states of flip-flops 72 and 73:

| | Flip-Flop 73($Y_1$) | Flip-Flop 72($Y_2$) |
|---|---|---|
| Off hook | 0 | 0 |
| On hook (initial) | 1 | 1 |
| On hook (0–5 sec.) | 0 | 1 |
| On hook (>5 sec.) | 1 | 0 |

In particular, toggle pulses on lead 170 connect to terminal T of flip-flop 73. Flip-flop 73 toggles whenever flip-flop 72 is set. Thus, looking at the above chart, it may be appreciated that flip-flop 73 will toggle twice during the sequence in which the clock pulses on conductor 170 are counted. Flip-flop 72, however, toggles only once, since a positive going voltage appears only on its terminal T when flip-flop 73 is set—i.e.; after flip-flop 73 has been toggled at least once. The outputs of flip-flops 73 and 72 are connected via cables 171 and 172 to terminals $Y_1$ and $Y_2$ of Function Calculator 80. Calculator 80 logically combines these inputs during another part of the program to ascertain how long the subscriber has been on-hook.

It is to be noted that flip-flops 73 and 72 are switched into the "0, "0" state (reset) from any other previous state when a switch-hook signal indicating off-hook is received, an up-date signal on cable 145 is received under program instruction, and the R bit is equal to 1. In addition, program instructions can be utilized to reset flip-flops 73 and 72 when the R bit = 1 and a restart timer pulse is sent on cable 173.

Data for controlling the lamps and the ringer of the station set is converted into bipolar signals and forwarded to a station set under control of Data Transmitter 70. One by one, each connected service module is interrogated in accordance with sequential program instruction signals sent to Service Input-Output Circuit 66. The "0" or "1" bit received from each module is temporarily stored in the T bit flip-flop 93 (FIG. 3) and sent over conductor 116, when required, to transmitter 70 for conversion and transmission to the station set. It is to be noted that the signal from circuit 66 is logically compared in Exclusive OR gate 87 with a signal from the Function Calculator 80 sent over conductor 137. The latter has the capability of altering any intermediate signal to meet various service conditions which will be discussed more fully hereinafter. An execute signal, "1" bit, which synchronizes signal transmissions is derived from the program instructions decoded by Decoder 39 and conveyed on conductor 138. This signal enables gates 88 and 89 for repeating the signal output of OR gate 87. Transformer 79 converts those signals to bipolar signals for the transmission over conductors DT and DR to the station set.

Function Calculator 80, a sum of products calculator, dynamically calculates in accordance with program instruction signals received via conductors 139–143 (terminals A, B and C of Multiplexer 81) any combinatorial logic function of the variables presented to multiplexer 81. At certain times during a program execution, calculator 80 provides temporary storage for data being manipulated. Although calculator 80 does not initiate any operational sequence, it has the ability to block various operations and thereby alter completely the response of a station module to program instruction signals on leads A0–A6 (FIG. 2). Thus in a real sense, program instructions presented to the station module are dynamically rewritten by the action of calculator 80 dependent upon its interpretation of circuit variables. Calculator 80 is a synchronous, sequential device which sacrifices speed of operation for circuit simplicity. It operates essentially under program control and is capable of performing a variety of logic operations—such as an AND function, an OR function, an NAND function, and so forth.

Multiplexer 81 is, in effect, a variable selector with $n$ inputs on which input variable signals appear and any one of which may be connected to the terminal labelled D in accordance with the code received on terminals A, B, and C. The output of multiplexer 81 is complemented by the Exclusive OR Gate 82 if the signal on lead 142 is "1" and not complemented if the signal is "0." The AND function calculator comprising gate 83 and flip-flop 84 forms the *product* of (complemented/noncomplemented) sequentially received input variables and stores the answer as the state of flip-flop 84. The OR function calculator comprising gate 85 and flip-flop 86 sequentially forms the *sum* of products at the output of the AND function calculator. Thus it may be seen calculator 80 can sequentially form any combinatorial logic function of the input variables presented to the variable selector, multiplexer 81. For additional details as to the working of logic function calculators in general, reference may be made to U.S. Pat. No. 3,246,303 to L. D. Amdahl et al. of Apr. 12, 1966.

An example of the operation of calculator 80 in solving the problem: $F = Y_1Y_2\overline{T} + \overline{Y_1}\overline{Y_2}T$ is now presented. Restating the problem, it is desired to determine the answer, F, to a problem consisting of the sum of two products of three variables (complemented and uncomplemented). The function F may be solved by inputting the problem variables, one at a time, beginning at the left-hand side. An equal sign requires one to preset flip-flop 84 and to clear flip-flop 86. Flip-flop 84 may be preset by a 0 level signal on conductor 144. Flip-flop 86 may be reset by a 0 level signal on conductor 174. In reading the variables from left to right, when a plus sign(+) is encountered, the state of flip-flop 84 is forwarded to flip-flop 86 and flip-flop 84 is preset once again.

Assuming we have initialized flip-flops 84 and 86 in accordance with the equal sign, assume that program signals appear on conductors 139–141 for selecting terminal 3, $Y_1$, which is connected via terminal D to Exclusive OR gate 82. Since the problem does not require $Y_1$ to be complemented, program control generates a 0 level signal on conductor 142. The output of gate 82 is combined with the output of flip-flop 84 in AND gate 83; and upon receipt of a toggle signal on lead 143, it is stored in flip-flop 84. The state of flip-flop 84 now conforms to the $Y_1$ signal. In sequence, $Y_2$ and the complement of T are coupled to flip-flop 84 each time the product of two variables is formed, i.e., $Y_1$ with $Y_2$ and the product of $y_1Y_2$ with $\overline{T}$. Following the instruction required for a plus sign, the program control generates a toggle signal on cable 175, causing the state of flip-flop 84 logically combined in OR gate 85 and stored in flip-flop 86. Flip-flop 84 is also preset. Subsequently, multiplexer 81 under control of program signals selects, in order, terminal 3, terminal 4, and terminal 0 forming the product of the variables $\overline{Y_1}\overline{Y_2}$ and $T$. Complements of the variables $Y_1$ and $Y_2$ are achieved by combining the output of multiplexer 81 with a one signal on cable 142 in Exclusive OR gate 82. To arrive at the answer, $F$, the state of flip-flop 84 is summed with the previous product of variables $Y_1Y_2$ and $\overline{T}$ stored in flip-flop 86. Upon receipt of a toggle signal on cable 175, the output of flip-flop 86 is logically combined in OR gate 85 with the output of flip-flop 84 and stored in flip-flop 86. The resultant answer, $F$, is the state of flip-flop 86 and is referred to hereinafter as the R bit.

Figure 8:
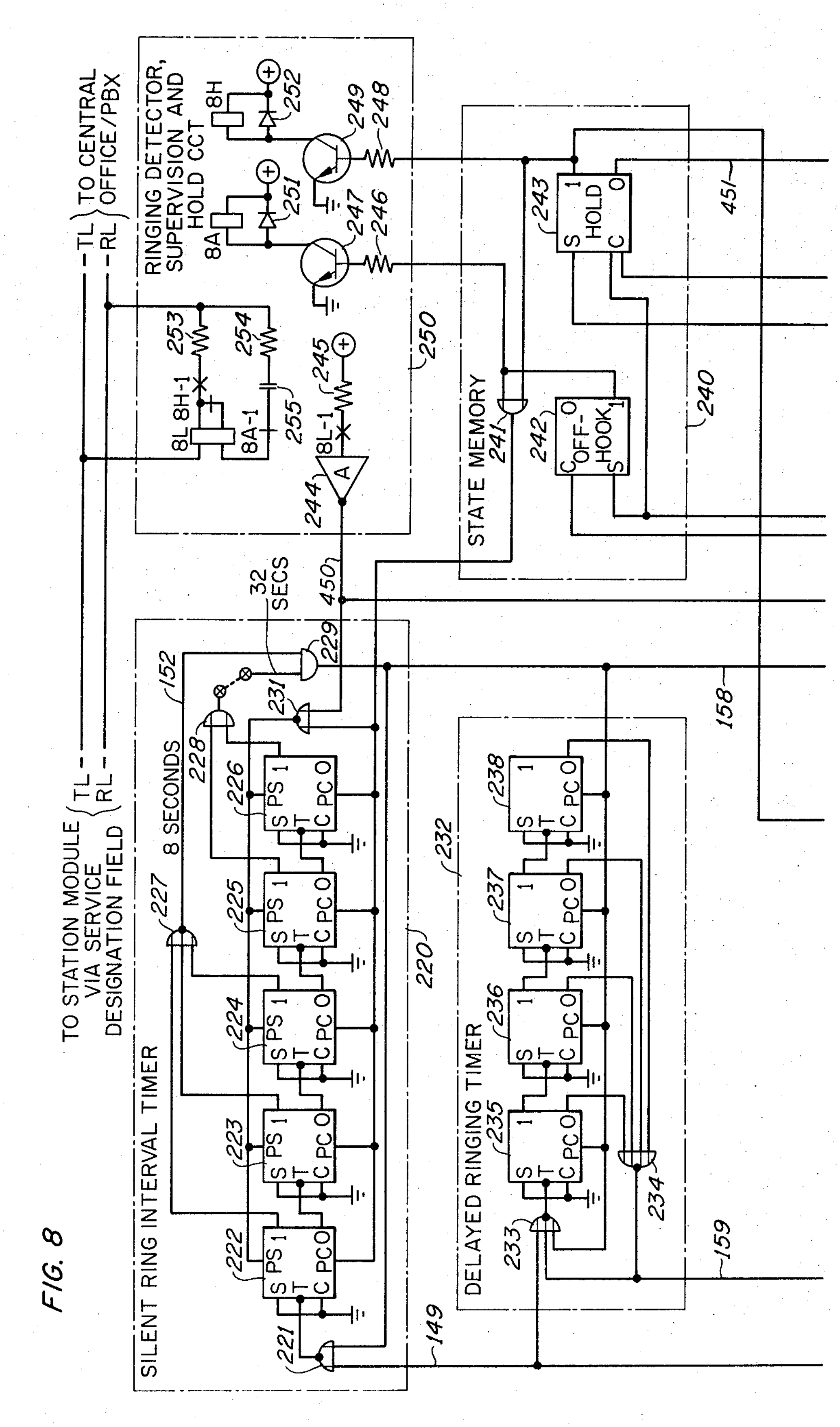
FIGS. 8 and 9 show the circuitry of line module.
Figure 9:
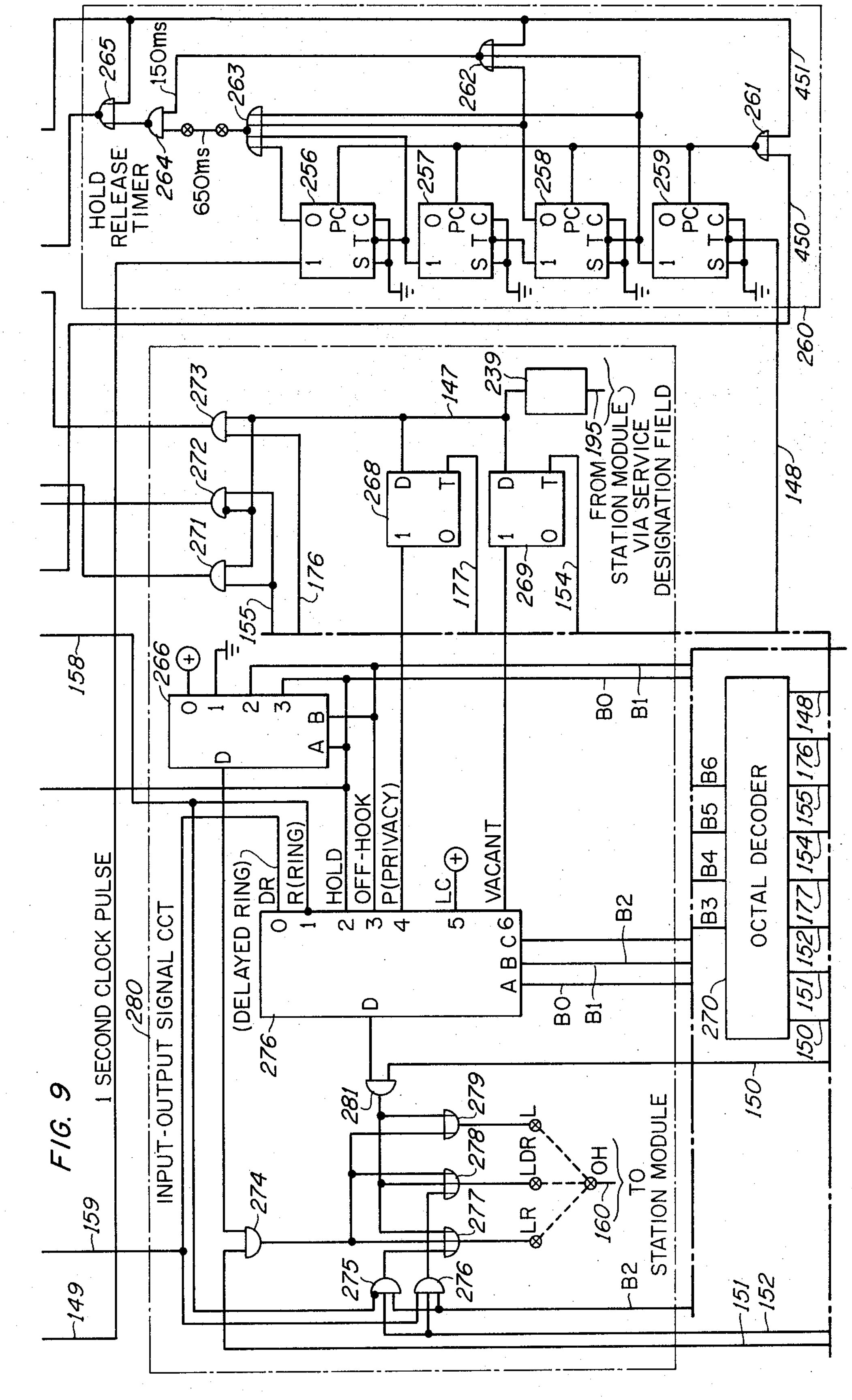

Line Module (FIGS. 8 and 9)

This module provides an interface between a central office or PBX line and cross-connected station modules. It is controlled in accordance with program signals forwarded by the multiphase system clock over conductors B0–B6 shown in FIG. 9. The line module can:

1. detect a ringing signal on leads TL and RL (FIG. 8) and send ringing and lamp information to all cross-connected station modules;
2. hold incoming calls and transmit a winking lamp signal to all cross-connected station modules as an indication of the hold condition;
3. detect off-hook conditions on leads TL and RL when a station set connected via the switching network of a station module is connected to the line module and transmit a steady lamp signal to all cross-connected station modules as an indication of an off-hook condition;
4. detect on-hook conditions occurring on "held" calls, and in such an event, restore the line module to an idle state after 150 milliseconds (650 ms. with option);
5. time the silent intervals between successive ringing bursts (8 seconds or 32 seconds, depending upon a wired option);
6. provide privacy which may be activated by any station set cross-connected to the line circuit; and
7. maintain a busy indication regardless of the line state condition until reset by a signal from the station module.

The line module contains some conventional key telephone circuitry principally in the sub-circuit entitled Ringing Detector, Supervision and Hold Circuit 250. Some of the details of this circuitry may be found by reference to U.S. Pat. No. 3,239,610 to C. E. Morse et al. of Mar. 8, 1966. A major portion of the line module circuitry is concerned with various timing operations. Silent Ring Interval Timer 220, as the name implies, times the silent period between consecutive ringing signals to ascertain an on-hook condition occurring during the ringing interval. Delayed Ringing Timer 232 times for a predetermined interval after detection of the initial ringing signal. The output of timer 232 is conveyed to all associated station modules at a time prescribed by program instructions to cause ringing or lamp signals at stations associated with cross-connected station modules. Hold Release Timer 260 times a fixed interval after a PBX or central office on-hook condition has been detected during a hold condition.

Timer 220, timer 260, and timer 232 are similar in various respects principally because they comprise cascaded stages of flip-flop circuits, counter circuits, which may be triggered sequentially in response to the receipt of a clocking pulse. The clock signals for timer 260 are derived from program instructions decoded by decoder 270 and conveyed on lead 148 to terminal T of flip-flop 259. The output of the last stage, flip-flop 256, is connected via conductor 149 to output gates 221 and 233 of respective timers 220 and 232. Ordinarily, the counter circuit of timer 260 is free-running so long as the clock pulses appear on conductor 148, producing a one second pulse on lead 149.

The ringing detector consists of relay 8L, capacitor 255, and resistor 254 shown in Ringing Detector, Supervision and Hold Circuit 250 (FIG. 8). Upon receipt of a ringing burst on leads TL and RL, relay 8L operates over an operating path which includes in series connection the upper and lower windings of relay 8L, break contact 8A–1, capacitor 255, and resistor 254. During the idle condition, a one level signal appears on conductor 158 which it may be seen connects to terminal PC of flip-flops 235–238 of Delayed Ringing Timer 232. Thus these flip-flops are held in the clear state. Upon detection of ringing, flip-flops 222–226 are preset in the set state. The counter arrangement of timer 220 counts down—i.e., initially all flip-flops are set; and as pulses are counted, succeeding stages are reset. The path for initializing flip-flops 222–226 may be traced from battery in circuit 250, resistor 245, make contact 8L–1, amplifier and inverter 244, and gate 231. Setting flip-flops 222–226 changes the level on conductor 158 from "1" to "0" for allowing delayed ringing timer 232 to begin to count a 16 second interval. In particular, when flip-flops 222–226 are set, their respective outputs, connected to OR gate 227 and to OR gate 228, generate a "0" signal on conductor 158. When the ringing burst ceases, relay 8L releases and the set pulse is removed from flip-flops 222–226. Since the flip-flops 222–226 are no longer jammed in the set state, pulses appearing on conductor 149 via OR gate 221 toggle flip-flop 222. In succession, and at half the frequency, succeeding flip-flop stages are toggled. Flip-flop 226 is toggled every 16 seconds. When the next ringing burst appears, relay 8L reoperates and sets flip-flops 222–226 and thereby cancels any count made since the last ringing burst. If successive ringing bursts do not occur within 8 seconds, the output of OR gate 227 is changed from a 0 to a 1 state. If it is desired to time for 32 seconds, gate 228 is connected to gate 229 and gate 229 produces a "0" output only after gates 227 and 228 develop "1" at their respective outputs. If timer 220 times out, conductor 158 is made high, clearing flip-flops 235–238 of Delay Ringing Timer 232.

Timer 232, as previously mentioned, is maintained in a clear, or reset state, normally until the first ringing burst is detected. When the "set jam" signal on conductor 158 is removed, the clock signals on conductor 149 are connected via OR gate 233 to toggle flip-flop 235. The counter arrangement of timer 232 counts up—i.e., all flip-flops are initially reset and are set as each pulse is counted. If a jam set pulse does not appear on conductor 158 within 8 seconds, flip-flops 235–238 are all set producing at the output of OR gate 234 a "1" signal on lead 159.

For traffic control reasons, a busy indication is recorded in state memory 240 after a call is released and memory 240 is reset to an idle state only upon a signal from a station module. Specifically, flip-flop 242 shown in the lower right-hand corner of FIG. 8 records the off-hook condition if set. It is reset by a signal from AND gate 271 shown in FIG. 9, which is, in turn, controlled by a program instruction as interpreted by octal decoder 270 via conductor 155 and a station module signal on conductor 147. If the line module is busy when the latter signal is sent, flip-flop 242 remains set.

A hold condition is established in response to an intermodule signal received concurrently with a program instruction. In FIG. 9, AND gate 273 is responsive to a "1" signal on conductors 147 and 176 to produce a set signal to set flip-flop 243, thereby operating relay 8H over an obvious path. In operating relay 8H at its transfer, contact 8H–1 connects one winding of relay 8L to leads TL and RL to monitor the line supervisory signals.

Hold Release Timer 260 times interruptions in the supervisory signals received on leads TL and RL during a hold condition. If there is no supervisory signal for at least 150 ms., (650 ms. if a wired option is provided), then the hold condition is released and the line module is restored to the idle state. In the hold condition and while an off-hook signal is maintained on leads TL and RL flip-flops 256–259 are jammed in their reset position. When the supervisory signal is interrupted, relay 8L releases and the signal on conductor 450, shown at the lower right-hand corner of FIG. 9, is changed from a "0" to a "1." As a result, the jam reset signal on flip-flops 256–259 is removed. Accordingly, clock pulses on conductor 148 toggle flip-flop 259 and the count begins. If the on-hook condition is only temporary, relay 8L reoperates and conductor 450 is restored to 0 state resulting in a jam reset signal which is applied to flip-flops 256–259. Gate 262 of timer 260 produces an output after 150 ms. which clears the hold flip-flop 243 when flip-flop 258 is set and flip-flop 259 is reset. If the wired option for 650 ms. is provided, the hold flip-flop 243 is not cleared until flip-flop 257 is set and flip-flop 256 is reset.

Turning next to State Memory 240, it contains memory devices, flip-flop 242 and 243, for recording the off-hook and hold conditions of the line module. The states of these memory devices are set or reset in response both to program instruction signals decoded by decoder 270 and signals from cross-connected station modules. The states of Memory 240 can be forwarded during a program sequence to a station module where they are computed and returned to set, or reset, the memory devices of Memory 240.

In the lower left-hand corner of FIG. 9 there is disclosed octal decoder 270 which performs substantially the same function as decoder 39 (FIG. 2) discussed previously. It functions to convert program instruction signals received on leads B0–B6 in a predetermined manner into execute and control signals on various leads. Specific details as to the particular ones of those leads which are activated in response to program instructions are disclosed in the section headed "System Programs."

Input-output signal circuit 280 is controlled in accordance with program instruction signals to store and to forward intermodule signals conveyed between the line module and interconnected station modules. Incoming signals appear on conductor 195 which, it will be recalled, is cross-connected to each particular station module. Memory buffer 239 furnishes temporary storage as well as isolation to protect the integrity of the signal channel. Outgoing signals from the line module are conveyed over conductor 160 which is also cross-connected to each station module associated with the line module. It is to be noted that there are shown three alternative wiring plans for the outgoing data lead. Terminal OH is cross-connected to terminal L if lamp signals only are desired, cross-connected to LR if lamp and ringing signals only are required, and to terminal LDR if lamp signals and delayed ringing are preferred. Multiplexer 267 and multiplexer 266 are controlled by instruction signals at various times during the program to couple particular ones of the line module state signals to outgoing signalling conductor 160. Flip-flops 268 and 269 are additional temporary memory for incoming signals on conductor 147.

The privacy feature of the line module is actuated in response both to an intermodule signal and a program instruction signal on conductor 177. When a station requests privacy, the station module associated with the originator's station set transmits an intermodule signal which is received via conductor 147 and stored in flip-flop 268. Thereafter, during a different portion of the program, multiplexer 267 is controlled by program instruction signals to couple the stored privacy signal via AND gate 281 and one of the cross-connected gates 277–279 to all cross-connected station modules. The particular station module associated with the station set having made the request ignores the signal while all other station modules interpret the signal as a block, or inhibit, signal preventing network connections to the line module.

Figures 10, 12, 13, 14:
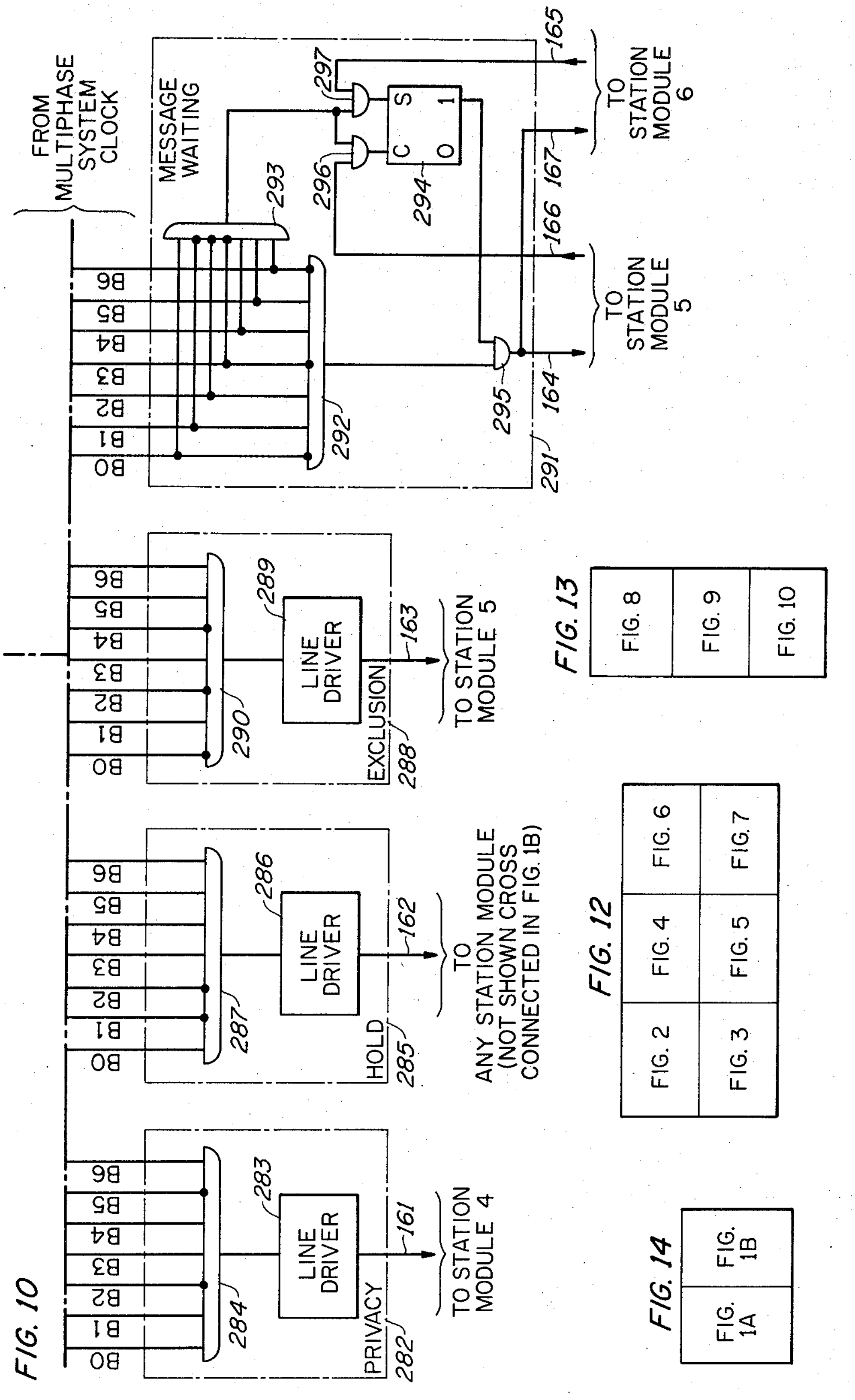

Privacy, Hold, Exclusion (FIG. 10)

These three service modules although related to different features are considered together because their internal circuitry is substantially identical and they function in substantially the same manner. Each module comprises an AND gate connected to instruction signal conductors conveying program signals from the multi-phase system clock. Each, it will be noted, however, have different coded inputs so that their respective AND gates 284, 287, and 290 operate on different coded signals. Thus, each time a code corresponding to one of these features appears on conductors B0–B6, a signal is sent via respective line drivers 283, 286, and 289 over output data leads 161, 162, and 163. These leads are cross-connected to all of the station modules with the particular service so that they receive these signals at prescribed times during the program. A more meaningful understanding of these feature modules can be obtained from a consideration of specific program operations.

Message Waiting (FIG. 10)

Message Waiting Module 291 operates in two modes in accordance with two separate and distinct program instruction signals. In the one case, AND gate 292 is turned on and if flip-flop 294 is set, a signal is transmitted via conductor 164. A different code operates AND gate 293 for setting flip-flop 294, if an intermodule incoming signal is present on conductor 165.

In actual operation, conductors 164 and 166 are cross-connected to a station module associated with one particular set. Conductors 165 and 167 are cross-connected to a second set where the station subscriber has the ability to answer calls for the first set and desires the additional ability to leave a signal indication of such calls when unanswered by the first set. The station module associated with the second set generates a signal which is coupled over conductor 165 and sets flip-flop 294 at a particular interval during the program determined by the operation of gate 293. Thereafter, the output of flip-flop 294 (term. 1) is conveyed via gate 295 during a different interval of the program, as determined by the operation of gate 292 to the station module associated with the first station set over conductors 164. The latter station set, in turn, controls a lamp indication at the first station set. When the subscriber of the first station set wishes to extinguish the indicating lamp, he transmits a signal by depression of a key, for example, and the associated station module forwards a signal via conductor 166 which clears flip-flop 294 during a particular interval of the program as determined by the operation of gate 293.

System Program

All modules connect to multi-phase system clock 7 wherein clock signals are generated for directing circuit operations. In the illustrative example, the output of clock 7 is divided between an A bus which connects to all station modules and a B bus which connects to all other modules. The A and B bus can be arranged to convey identical instruction signals or only so much of the program as pertains to the modules served. In the present example, both the A and B bus convey concurrently identical clock, or instruction, signals.

A specific sequence of system clock signals, or words, is required to perform any operation. A word as used herein refers to a binary pattern of signals transmitted simultaneously on the system clock leads; and operations are programmed by specifying a sequence of system clock words. Each word is composed of 7 bits, or signals, designated for convenience as bits A0–A6, if sent over the A bus, and as bits B0–B6, if sent over the B bus. Hereafter reference is made to bits A0–A6 only, but it will be understood that the following description pertains as well to bits B0–B6.

Within each word there is a sub-structure identifying the mode, the operating function, and an execute signal. Bits A0 and A1 specify the operating mode of which there are four possible states.

| Bits A1 | Bits A0 | Operation Mode or Function |
|---|---|---|
| 0 | 0 | Initialize/Update |
| 0 | 1 | Register Shift Mode |
| 1 | 0 | Calculate Function |
| 1 | 1 | Station Set Transmission |

Bits A2–A5, referred to herein as control bits, specify and control the particular operation performed in all modes except Mode "11." Bit A6 in three of the modes serves as the execute bit. The execute bit of a single word is insufficient in certain modes to convey the execute signal required for a particular instruction. For example, in Mode "00," the Initialize/Update mode, each instruction after being converted to its binary equivalent must be transmitted two times, the only difference in each transmission being the bit position A6. Operations in Mode "00" are initiated by level changes and thus two words must be consecutively generated to execute the instruction This is obtained by sending a zero in the bit position A6 in the first binary word followed by a one in the second binary.

"00" Mode (Initialize/Update)

This mode contains the initializing and updating instructions for various module circuit components. In addition, it contains instructions which pertain to the function calculator mode which are included herein because of code shortages in the function calculator mode. This mode also contains switch-hook timing and updating instructions. Many of the instructions in this mode are what is termed "conditional instructions" in that they are internal state dependent instructions. Such instructions are not executed unless some circuit condition is met. Uniformally throughout these instructions the condition is the R bit = 1. Ordinarily, the conditional instruction follows a series of Mode "10," Function Calculator, instructions.

In Mode "00," shift registers and data transfer circuitry of the station modules are inhibited. The respective level of conductors A0 and A1 in this mode are 0 and this condition is decoded by the modules to generate jam set signals.

The following is a list of program instructions which may be performed in this mode. Along with each instruction there is the binary format for leads A0–A6 and a brief summary of the operation and circuitry activated in accordance with the instruction signal. In addition, there is included in the summary, the identity of conductors which carry the enabling signals.

If R = 1; SEND:ALL (0,0,0,0,0,0)

In FIG. 3 of the station module, circuit 66 is activated to signal all connected service modules when conductor 120 is "1" (R bit) and conductor 118 is 0.

If R = 1; UPDATE S. H. BIT (0,0,1,0,0,0)

In FIG. 6 of the station module, circuit 71 is controlled by the signal level on conductor 145 to take the switch-hook data stored in cell 7 of register 56 and store it in flip-flop 73. The execution of the instruction is dependent on the level of the R bit. If R = 1, the instruction is executed; otherwise, circuit 71 is unaffected.

If R = 1; RESTART TIMER (0,0,0,1,0,0)

This instruction cycles flip-flops 72 and 73 of circuit 71 (FIG. 6), respectively, to state "1" if R bit = 1 by application of a step pulse on conductor 173.

UPDATE S. H. TIMER (0,0,1,1,0,0)

This instruction is to be inserted into the program so that the instruction appears at 5-second intervals. In FIG. 6, it controls the generation of a toggle pulse on conductor 170 for setting and resetting flip-flops 72 and 73.

RD=0; (0,0,0,0,1,0)

This instruction clears flip-flop 51 shown in FIG. 4 and is used preliminary to searching for a "1" bit (button depression) in register 56.

R=R+X; (0,0,1,0,1,0)

This instruction is one of the function calculate mode instructions for convenience placed in this mode. With reference to FIG. 6, it logically sums the data stored in flip-flop 86 (R bit) with that stored in flip-flop 84 (X bit). The instruction is executed upon receipt of a toggle pulse on conductor 175.

X=1; (0,0,0,1,1,0)

This instruction sets flip-flop 84 (FIG. 6) (X bit) of calculator 80 with a set pulse on conductor 144.

R=0, (0,0,1,1,1,0)

This instruction clears flip-flop 86 (FIG. 6) (R bit) of calculator 80 with a reset pulse on conductor 174.

MISM=0, (0,0,0,0,0,1)

This instruction clears flip-flop 57 (FIG. 4), mismatch signal store, of Data Register 53 with reset pulse on conductor 197.

MISM=1, (0,0,1,0,0,1)

Flip-flop 57 (FIG. 4), mismatch signal store, of Data Register 53 is set with a pulse on conductor 198.

If R=1; READ:ALL (0,0,1,1,0,1)

With this instruction all interconnected modules are read by circuit 66 (FIG. 3) and their signals are logically combined in "OR" gate 94 (FIG. 3) and stored in T bit flip-flop 93. If R = 1, the level on conductor 120 and the program instruction signal level on conductor 110 enable all line receive AND gates 99. Concurrently, a toggle signal is sent over conductor 117 so that the logical output of gate 94 is stored in flip-flop 93.

If R=1; READ:ONE (0,0,0,0,1,1)

This instruction is similar to the one immediately above except that a "0" level signal occurs on conductor 118 allowing one interconnected module to be read in accordance with a button code stored in button register 40 (FIG. 7), and its output to be stored in T bit flip-flop 93.

If R=1; SEND:ONE (0,0,1,0,1,1)

In FIG. 3, circuit 66 is activated to send a sign to one of the interconnected service modules in accordance with the button code stored in button register 40. In particular, conductor 118 conveys a "0" level signal and conductor 120, a "1" level signal to initiate the action.

If R=1; NI=1 (0,0,0,1,1,1)

The network blocking flip-flop 213 shown in FIG. 5 is set with a set pulse on conductor 133 if concurrently the signal level on conductor 120 is a "1."

If R=1, NI=0 (0,0,1,1,1,1)

The network blocking flip-flop 213 shown in FIG. 5 is cleared with a reset pulse on conductor 134 if concurrently the signal level on conductor 120 is "1."

It is to be noted that the binary code, 0,0,1,0,1,1 is unused.

"10" Mode (Function Calculate)

This mode contains various instructions each having a similar format for using Function Calculator 80 shown in FIG. 6. It will be recalled that the function calculator may be used to form the product of variables, or their complements, and to add products of variables to each other. All the instructions to operate Function Calculator 80 are not contained in this mode. Due to a shortage of codes, instructions in this mode are limited to forming the product of variables or their complements. Products are added together utilizing an instruction from the "00" mode, namely, $R=R+X$.

In this mode, the signals on conductors A0 and A1, respectively "1" and "1," inhibit the transmission of execute signals on all conductors in the station modules except conductor 143 which controls the toggling of the $X$ bit flip-flop 84.

All instructions in this mode have the same basic format and are written as shown below. Two consecutive binary encoded words are necessary for each instruction. This is required so that a toggle pulse may be generated using the A6 bit position of the word. Unlike the "00" mode, operations in this mode are executed on pulse transitions rather than step functions, thus writing two consecutive words wherein A6 is "0" followed with the same instruction word except A6 is a "1" generates the necessary pulse transition.

$X=X\cdot$ (Variable/$\overline{\text{Variable}}$) (1,0,A2,A3,A4,A5,- - -)

The variable which is to be multiplied by X is indicated in accordance with a binary code transmitted in bit positions A2, A3, and A4. If a complement of the variable is to be formed in the function to be solved, this is indicated in bit position A5. The following chart indicates the binary code for bits A2, A3, and A4 for different variables.

| | BITS | | |
|---|---|---|---|
| A2 | A3 | A4 | Variable |
| 0 | 0 | 0 | T |
| 1 | 0 | 0 | NC |
| 0 | 1 | 0 | PL |
| 1 | 1 | 0 | Y1 |
| 0 | 0 | 1 | Y2 |
| 1 | 0 | 1 | MISM |
| 0 | 1 | 1 | RD |
| 1 | 1 | 1 | N1 |

To form the complement of the variables indicated by the binary code written in bit positions A2–A4, Bit A5 = 1.

With reference to FIG. 6, the data in bit positions A2–A4 are connected respectively to conductors 139–141 which connect to terminals A, B and C of multiplexer 81. Reference may be made to FIG. 11 wherein terminal activated for each octal code received at terminals A, B, and C are enumerated. The information on bit position A5 connects via conductor 142 to exclusive OR gate 82 for therein forming the complement of the variable selected by multiplexer 81. This same instruction controls the transmission of a toggle signal on conductor 143 and the product of the selected variable and the previous state of the X bit flip-flop 84 is stored in the latter flip-flop.

"01" Mode (Register Shift)

This mode consists of numerous instructions for circulating and shifting data between Button Register 40, Memory Register 46, and Data Register 53. Some of the shifting instructions are conditional. The condition may be R = 1 and Mismatch = 0, or R = 1, alone. Unless these conditions are met in the internal circuit at the time the instruction is received by the module, the instruction is not executed.

Instructions in this mode are similar those instructions of the "00" mode in that two consecutive binary encoded words must be written for each instruction. This obtains because operations are executed on receipt of a step function as opposed to pulse transitions; thus the program must generate a 0–1 in consecutive words in the A6 bit position.

The following conventions are observed in writing program instructions in this mode:

CD = Clock Data
BR = Button Register
DR = Data Register
MR = Memory Register
+ = Is shifted into In this mode, decoders 37 and 38 of System Clock Decoder 39 are inhibited by the signal levels 0 and 1 on respective leads A0 and A1. This prevents the operation of all system circuits except register circuits 40, 46, and 53.

The following are a list of instructions for this mode. Under each instruction is given a brief summary of the circuit operations, and there are indicated the leads which are activated upon the receipt of the particular instruction signal.

If R = 1 and MISM = 0; CD + BR (0,1,0,0,0,A5,A6)

In this instruction, data presented in the A5 bit position is shifted into register 42 of Button Register 40. The shift is, however, conditioned upon a "1" level signal on conductor 120 and a "0" level signal on conductor 105. Also, conductor 113 is "0" for connecting terminal 0 with terminal D of multiplexer 41. Each instruction will shift register 42 once and accept a "0" or "1" in the A5 bit position in cell 1. A toggle pulse for shift register 42 is conveyed on conductor 103 and derived from the signals on lead A6.

DR +DR; If R = 1 and MISM = 0 CD → BR

This is a compound instruction which calls for circulation of data in the data register and concurrently therewith shifting of data recorded in bit position A5 into register 42 of Button Register 40. It is to be noted that the shifting of data from bit position A5 into Button Register 40 occurs only if two different conditions are met; i.e., conductor 120 conveys a "1" level on conductor 105 and a "0" level. This is the instruction used to locate a "1" bit in the Data Register 53.

This instruction format causes conductor 113 to carry a "0" level signal for connecting clock data on conductor 196 to terminal D of register 42. In addition, execute signals on position A6 are coupled via conductor 103 to T terminal of register 42. In Data Register 53, cable 101 carries a "1" level and thereby terminals 1 and D of multiplexer 55 are interconnected.

CD + BR (0,1,0,1,0,A5,A6)

This instruction is substantially the same as the first instruction enumerated above in this mode with the exception that the conditionals are removed.

DR + DR; CD + BR (0,1,0,1,1,A5,A6)

This instruction is substantially the same as the second instruction mentioned above in this mode with the exception that the conditionals are removed.

MR + BR; IF R = 1 THEN MR + MR (0,1,1,0,1,0,A6)

This instruction causes the data stored in shift register 47 of Memory Register 46 to be circulated if conductor 120 has a "1" level signal thereon. Also, this instruction transfers data stored in Memory Register 46 into register 42 of Button Register 40. During this instruction, a "0" level is forwarded on conductor 112 for connecting terminals 0 and D of multiplexer 48. Also, a "1" level is forwarded on conductor 139 to enable a toggle pulse on conductor 103 to shift register 47. In addition, a "1" level is conveyed on conductor 113 for connecting terminal 1 to terminal D of multiplexer 41. The latter connection couples the circulating path of Memory Register 46 with the input terminal of register 42.

MR + MR; MR + BR (0,1,1,0,0,0,A6)

This instruction is substantially the same as the preceding instruction with the exception that the conditional, R = 1, is omitted.

BR + MR; IF R = 1 THEN MR + BR (0,1,1,1,1,0,A6)

In this instruction, the information stored in Button Register 40 is exchanged with the information stored in Memory Register 46. To direct this operation, a "1" level signal is conveyed on conductors 112, 113 and 139. These signals connect terminal 1 to terminal D of multiplexers 41 and 48. In this configuration, both registers are toggled simultaneously, and their outputs are exchanged. The transfer from the memory register to the button register is, however, conditioned on a "1" level on conductor 120.

MR + BR; BR + MR (0,1,1,1,0,0,A6)

This instruction is substantially the same as the preceding instruction with the exception that the conditional R1 is omitted.

"11" MODE (SEND AND RECEIVE)

During this mode, data is transmitted to a station set and simultaneously received from the same set. The return signal from the station set is a consequence of the transmitted signal, since the station set apparatus contains essentially passive circuitry. Uniquely, each word in this mode controls a plurality of circuit operations instead of the usual single operation described hereinbefore for other modes.

In this mode, the respective one signals on leads A0 and A1 preset a number of station module circuits. With reference to FIG. 6, a "1" level is transmitted on conductors 139–141 for setting multiplexer 81 at the T bit variable position. In addition, conductor 142 conveys a "0" signal so that the T bit variable is not complemented. Thus, in this mode, the X bit of the function calculator equals the T bit and the calculator is used as a simple memory device. Also, in this mode, referring to FIG. 4, conductor 101 conveys a "0" level signal; and accordingly, multiplexer 58 connects the clock signals derived from the incoming signals to the shift register 56. This configuration synchronizes the incoming signal and the shift register 56 operation. Conductor 114 conveys a "1" signal to Button Register 40 (FIG. 7) for making the register shift unconditionally with respect to the R bit. Another initial condition set by the mode is the "0" level on conductor 113 (FIG. 7) which connects terminals 0 and D of multiplexer 41 so that clock data in the instruction word may be coupled directly into Button Register 42.

The following list of instructions may be simultaneously performed as a result of a single word instruction in this mode. Each bit position A2–A6 individually controls each of the program instructions as follows:

| | Instruction | Bit |
|---|---|---|
| 1. | X=X·T | A2 |
| 2. | READ:ALL/ONE | A2,A4 |
| 3. | TRANSMIT | A3 |
| 4. | X=1 | A6 |
| 5. | CD+BR | A6,A5 |

The instructions numbered 1, 2, and 5 function on transitions while the instructions numbered 3 and 4 are activated on level changes or step functions. Thus, each instruction in the "11" mode must be preceded by "0"'s in bit positions A2–A6 to assure transitions and level changes.

A2 BIT

In the "11" mode, if the A2 bit is "1," effectively two instructions are generated and they are X = X·T and READ:ALL/ONE. The A4 bit in the word determines whether the READ instruction is ALL or ONE. A "1" as the A4 bit indicates ONE and a "0" in the bit position indicates ALL.

It will be recalled that calculator 80 is jammed into a specific circuit configuration during this mode so that the product of the T variable is formed with the initial state of the X bit, flip-flop 84, on the receipt of a toggle pulse on conductor 143. This pulse is generated if the A2 bit = 1. Concurrently, the data in T bit flip-flop 93 (FIG. 3) is updated so that the intermodule signal from ALL/ONE of the interconnected service modules is read. This latter action is initiated by the presence of a toggle voltage on conductor 117.

BIT Bit

A "1" level in this bit position directs the transmission of the information stored in the T bit flip-flop 93 to the station set. This instruction is designated TRANSMIT. In particular, a "1" signal on conductor 138 (FIG. 6) enables data transmitter 70. It is to be noted that the X bit equals the T bit and, therefore, no change in the T bit signal occurs as a result of logically combining the T bit and X bit signals in exclusive OR gate 87.

Referring to FIG. 4, for each pulse transmitted, a pulse is received via data receiver 53 from the station set. The received information is stored in shift register 56 of data register 53.

A4 BIT

The presence of a "0" or "1" in this bit position determines whether ALL or ONE of the interconnected service modules transmit signals to the station module. For additional details refer to the discussion above under the heading "A2 Bit."

A5 BIT

If it is desired to record data in Button Register 40 (FIG. 7) at the same time that signals are transmitted to and received from the station set, the data is recorded in this bit position. It will be recalled that the mode signals establish a connection between conductor 196 and shift register 42 for conveying directly into that register the binary information in this bit position.

A6 BIT

The signal in this bit position controls two distinct operations which are: X = 1 and CD+BR. The first instruction presets the X bit, flip-flop 84 of FIG. 6, to a "1" so that subsequent products formed between the T bit and X bit will be equal to the T bit. The data stored in bit A5 is shifted into register 42 when the A6 bit makes a transition between "0" and "1." Considering these operations in more detail, in FIG. 6 a "1" level in this bit position produces a ONE signal on conductor 144 which clears flip-flop 84. Also, a toggle pulse appears on conductor 103 (FIG. 7) for shifting register 42 to record the level on conductor 196.

OPERATIONAL PROGRAM FOR BASIC SYSTEM FUNCTIONS

The following is a set of sub-routines, each of which control the performance of specific circuit operations. The presented program must be operated in the order in which it appears herein. Changes, for example, to interpose new sub-routines, require re-examination of the initial conditions for succeeding sub-routines.

Insofar as it is possible, a brief discussion is inserted before groups of program instructions to indicate the function to be performed.

SUB-ROUTINE A: SCAN STATION SET

In this algorithm, data specifying the new state of station set ringer and lamps is received from connected service modules and transmitted to the station set in the following order: Ringer Lamp 6, Lamp 5, Lamp 4, Lamp 3, Lamp 2, and Lamp 1. In response to these signals, the station set will automatically return the following data in this order: Switch-Hook Status, Button 6, Button 5, Button 4, Button 3, Button 2, and Button 1. The incoming data is automatically shifted into Data Register 53 and compared bit by bit as it is received with the previously stored data in Data Register 53.

Before this operation can begin, the station module must be set to a specific set of initial conditions. To receive data from the service modules, the value of R bit (conductor 120) in Function Calculator 80 must initially be set to "1." The following instructions accomplish this purpose:

1. $X=1$
2. $R=X+1 \therefore R=1, X=1$

Before scanning operations begin, the code of button 6 (101) must be stored in the button register. The following set of instruction shift this code into Button Register 40, in order that the code is derived from the clock data in bit position A5 using instructions in the mode 01:

3. $CD+BR; CD=1$
4. $CD+BR; CD=0$
5. $CD+BR; CD+1 \therefore BR=101$

The received data is compared with the stored data in register 56 to determine a mismatch; thus the mismatch flip-flop 57 must be cleared before data is transmitted. In addition, an instruction must be included for clearing flip-flop 51 of Data Receiver 50 before data is transmitted. The following instructions set these initial conditions:

6. $MISM=0$
7. $RD=0$

At this point, all initial conditions have been set and we may now proceed to determine whether a ringing signal should be transmitted to the station set. To make this determination, the status of all interconnected service modules must be ascertained.

8. READ:ALL

The request for ringer signal at the station set is now stored in T bit flip-flop 93. Before it is transmitted to the station set, it is stored in the *X* bit and a request for modification signals, if any, is made. It is to be noted that all subsequent instructions will now be performed in the "11" mode.

9. $X=X{\cdot}T$
10. REED:ALL

Modification signals, if any, are now stored in the *T* bit flip-flop 93 and the prior request for ringer signals is stored as the *X* bit in flip-flop 84. At this point, the ringer signal may be transmitted to the station set. Note that what is transmitted is the EXCLUSIVE-OR OF *X* AND *T*.

11. TRANSMIT (Mode "11")

Let us assume for transmission of the remaining signals relating to lamp status button 6 through button 1 that they are to be made without modification. The *X* bit must be set to "0" and the data in the *T* bit is directly forwarded through Data Transmitter 70 to the station set. This data will be obtained one bit at a time utilizing codes stored in the button register to selectively receive intermodule signals. There is no initial update which will allow us to set $X=0$. *X* is set to 0 by selecting a variable known to be 0 and logically combining it with its complement in the Function Calculator 80. In this particular example, the *T* bit is selected. During this operation, all service modules are inhibited from transmitting data and therefore we are assured that a "0" level can be stored in the *T* bit flip-flop 93 with the first instruction.

12. READ:ALL—$X=X{\cdot}T$ ("11" Mode)
13. REPEAT INSTRUCTION NO. 12 $\therefore T=0$ and $X=0$
14. READ:ONE—TRANSMIT—CD+BR; $CD=1$ ("11" Mode) $\therefore BR=011$
15. REPEAT INSTRUCTION NO. 14 $CD=0 \therefore BR=110$
16. REPEAT INSTRUCTION NO. 14 $CD=0 \therefore BR=110$
17. REPEAT INSTRUCTION NO. 14 $CD=0 \therefore BR=000$
18. REPEAT INSTRUCTION NO. 14 $CD=1 \therefore BR=001$
19., 20. SEND TWO MODE 11 INSTRUCTIONS WITH NO FUNCTIONS CALLED FOR TO PROVIDE DELAY IN PROGRAM ALLOWING FOR RECEIPT OF LAST SIGNALS FROM STATION SET.

A mismatch between the received data and data stored in register 56 of FIG. 4 causes flip-flop 57 to be set.

Sub-Routine B: Store Mismatch Condition in R Bit

The following instructions set the R bit equal to "1" if $MISM=0$. $MISM=0$ occurs when consecutive data strings received from the station set are identical. If a mismatch occurs between received data and previously stored data, these instructions will set $R=0$. Many of the instructions in the following sub-routines are conditioned upon *R* bit = 1.

21. $X=1$
22. $R=0$
23. $X=\overline{MISM}\cdot X$
24. $R=X+R \therefore R=\overline{MISM}$ Sub-Routine C: Update Switch-Hook and Time-out Circuit The following instruction updates the switch-hook information stored in circuit 71 in the event the R bit is equal to "1." The latter occurs each time two consecutive scans match.

25. If $R=1$, UPDATE S.H.

Sub-Routine D: Advance Switch-Hook and Time-out Circuit

The next instruction is inserted at 5 second intervals in the program and unconditionally causes a pulse to be forwarded to circuit 71. The timed pulse advances the on-hook time out sequence which automatically selects a prime line in place of the line last used between 5 and 10 seconds after disconnect.

26. UPDATE S.H.

Sub-Routine E: Determine Button Depressed

The following algorithm contains instructions for scanning data received from the station set and for concurrently circulating all button codes starting at the code of button No. 6 until a "1" is detected. The latter is detected by $MISM=$ "1" and the circulation of codes is stopped at that point.

At the beginning and at the end of the sub-routine, instructions for setting the button register equal to the "No Connect" are sent. This is important because subsequent subnroutines are *not* conditioned on the detection of a code. Setting the register equal to "111" prevents false intermodule signals from being forwarded during these routines if no code is detected.

27. $BR=111$
28. $RD=0$
29. If $R=1$ and $MISM=0$, CD+BR; $CD=0$
30. If $R=1$ and $MISM=0$, DR+DR; CD+BR; $CD=1$ ∴ $BR=101$ (Button No. 6)
31. If $R=1$ and $MISM=0$, CD+BR; $CD=1$
32. If $R=1$ and $MISM=0$, DR+DR; CD+BR; $CD=0$ ∴ $BR=011$ (Button No. 5)
33. If $R=1$ and $MISM=0$, CD+BR; $CD=1$
34. If $R=1$ and $MISM=0$, DR+DR; CD+BR; $CD=1$ ∴ $BR=110$ (Button No. 4)
35. If $R=1$ and $MISM=0$, CD+BR; $CD=0$
36. If $R=1$ and $MISM=0$, CD+BR; $CD=0$
37. If $R=1$ and $MISM=0$, CD+BR; $CD=0$
38. If $R=1$ and $MISM=0$, DR+DR; CD+BR; $CD=1$ ∴ $BR=100$ (Button No. 3)
39. If $R=1$ and $MISM=1$, CD+BR; $CD=0$
40. If $R=1$ and $MISM=0$, CD+BR; $CD=0$
41. If $R=1$ and $MISM=0$, DR+DR; CD+BR; $CD=0$ ∴ $BR=000$ (Button No. 2)
42. If $R=1$ and $MISM=0$, CD+BR; $CD=1$
43. If $R=1$ and $MISM=0$, CD+BR; $CD=0$
44. If $R=1$ and $MISM=0$, DR+DR; CD+BR; $CD=0$ ∴ $BR=001$ (Button No. 1)
45. If $R=1$ and $MISM=0$, CD+BR; $CD=1$
46. If $R=1$ and $MISM=0$, CD+BR; $CD=1$
47. If $R=1$ and $MISM=0$, CD+BR; $CD=1$ Sub-Routine F: Send Button Depressed Signal In this sub-routine, instructions are generated for controlling the transmission of a "1" via the service input-output circuit 66 to the module corresponding to a "1" bit stored in register 56. In this manner, service modules are instructed that a station set has requested the service associated with that module. The signal is only sent at the time the button is depressed at the station set and only after the received station data has been verified. Note that during the previous sub-routine the code for "No Connect" was stored in the event no key depression was detected. Therefore, there is no necessity to inhibit this operation, since there is no service module corresponding to the "No Connect" code.

48. If $R=1$, SEND:ONE

Sub-Routine G: Send Button Depressed if Off-Hook

In this sub-routine, instructions are generated for controlling transmission of signals to service modules corresponding to keys depressed if the station is off-hook. The switch-hook status of the station set is stored in circuit 71 (FIG. 6). In particular, if flip-flops 72 and 73 are reset, the station set is off-hook. By storing the off-hook condition in the R bit, a signal is transmitted to the interconnected service module only if the station is off-hook. The following instructions store the value of $\overline{Y1}\cdot\overline{Y2}$ in the R bit.

49. $X=1$
50. $R=0$
51. $X=X\cdot\overline{Y1}$ ∴ $X=\overline{Y1}$
52. $X=X\cdot\overline{Y2}$ ∴ $X=\overline{Y2}\cdot\overline{Y1}$
53. $R=R+X$ ∴ $R=\overline{Y1}\cdot\overline{Y2}$
54. If $R=1$, SEND:ONE Sub-Routine H: Send Hold Signal This sub-routine contains instructions for determining whether a hold button was depressed and for sending a signal to the line module presently connected to the station set. Initially, it is determined if a connection is established; and if so established, the *R* bit is set to "1." Next, all hold modules send signals to the station module which is reading the signals at that time. Following this, the station module interprets the received information and sets the *R* bit to "1" if, in fact, the button depressed corresponds to a hold button. As a last step in the sub-routine, the button code corresponding to the station connected and stored in the memory register is put in the button register to control the input-output circuits 66 so that a signal can be transmitted indicating the hold condition.

55. $R=0$
56. $X=X\cdot\overline{NI}$ ∴ $X=\overline{Y2}\cdot\overline{Y1}\cdot\overline{NI}$
57. $R=R+X$ ∴ $R=\overline{Y1}\cdot\overline{Y2}\cdot\overline{NI}$
58. If $R=1$, READ:ONE Upon receiving the previous instruction, all hold modules transmit signals concurrently. If the button code corresponding to the one button depressed is a hold button, a "1" is stored in the T bit flip-flop 93.

59. $X=1$
60. $R=0$
61. $X=X\cdot T$
62. $R=R+X$ ∴ $R=T$

If $R=1$, this is an indication that a hold button was depressed.

63. If $R=1$,
    MR+BR
    BR+MR
64. SAME AS INSTRUCTION NO. 63
65. SAME AS INSTRUCTION NO. 63
66. If $R=1$, SEND:ONE
67. SAME AS INSTRUCTION NO. 63
68. SAME AS INSTRUCTION NO. 63

Sub-Routine I: Connecting Station Set to Line Module

In this algorithm, instructions are generated for connecting the line module corresponding to the button depressed via the network of FIG. 5. However, before the connection is established, a signal is forwarded by the line module to the station module to allow the network connection.

69. $X=1$
70. $R=0$
71. $X=X\cdot\overline{Y1}$ ∴ $X=\overline{Y1}$
72. $X=X\cdot\overline{Y2}$ ∴ $X=\overline{Y2}\cdot\overline{Y1}$
73. $R=R+X$ ∴ $R=\overline{Y1}\cdot\overline{Y2}$
74. If $R=1$, READ:ONE

*T* bit equals "1" if a connection should be made and equals "0" if no connection should be established. This bit is transmitted by the line module concurrently with the READ instruction.

75. $R=0$
76. $X=X\cdot T$
77. $R=R+X$ ∴ $R=\overline{Y1}\cdot\overline{Y2}\cdot T$
78. If $R=1$,
    MR+BR
    BR+MR
79. SAME AS INSTRUCTION NO. 78
80. SAME AS INSTRUCTION NO. 78
81. If $R=1$, $NI=0$ The last instruction causes the network connection to be established.

Sub-Routine J: Disconnect Service Module Network Path

The first set of instructions sets the network blocking flip-flop 213 (FIG. 5) and releases any existing connection upon detection of an on-hook condition. If the on-hook condition persists for more than five seconds, the code of the previously connected line stored in the memory register is replaced with the no-connect code, 111. The station set is on-hook if circuit variables $Y_1$ (flip-flop 73) and $Y_2$ (flip-flop 72) are both "1." Initially, therefore, the function $Y_1 + Y_2$ must be solved.

82. $R=0$
83. $X=1$
84. $X=Y_2 \cdot X$
85. $R=X+R$
86. $X=1$
87. $X=Y_1 \cdot X$
88. $R=X+Y_1 \therefore R=Y_2+Y_1$
89. If $R=1, NI=1$ If the on-hook condition persists for more than 5 seconds, the product of variables $Y_1$ and $\overline{Y}_2$ is 1. If that condition is met, the code 111 is shifted into the button register 40 and eventually into memory register 46.

90. $R=0$
91. $MISM=0$
92. $X=\overline{Y}_2 \cdot X \therefore X=Y_1 \cdot \overline{Y}_2$
93. $R=R+X \therefore R=Y_1 \cdot \overline{Y}_2$
94. If $R=1$ and $MISM=0$; CD+BR; $CD=1$
95. If $R=1$ and $MISM=0$; CD+BR; $CD=1$
96. If $R=1$ and $MISM=0$; CD+BR; $CD=1$
97. If $R=1$ and $MISM=0$; BR+MR
98. If $R=1$ and $MISM=0$; BR+MR
99. If $R=1$ and $MISM=0$; BR+MR $\therefore$ MR = Code 111

Sub-Routine K: First Idle Line Pickup (FILP)

The following set of instructions is designed to connect the station set to one of the idle lines appearing at the set. The lines are tested in a descending order beginning at the line associated with Button No. 6. When an idle line is found, a connection is established.

The initial instructions solve the function $\overline{Y}_2 \cdot \overline{Y}_1 \cdot NI$ to determine a call request. In addition, the function is combined with the function $\overline{MISM}$ to verify that there has been at least two consecutive scans detecting the call request condition. As usual the first instructions establish initial conditions.

Figure 15:
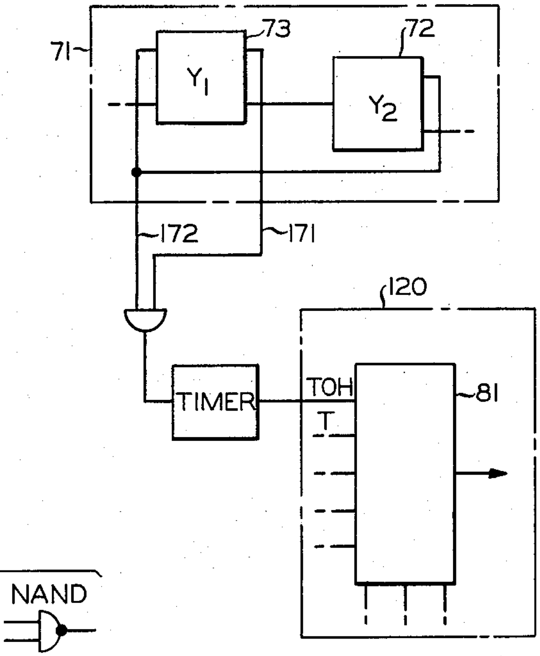
FIG. 15 shows a portion of the station module.

100. $R=0$
101. $X=1$
102. $X=NI \cdot X$
103. $X=\overline{Y}_1 \cdot X$
104. $X=\overline{Y}_2 \cdot X$
105. $X=\overline{MISM} \cdot X$
106. $R=X \therefore R=\overline{MISM} \cdot \overline{Y}_2 \cdot \overline{Y}_1 \cdot NI$ If it is desired to interpose a time delay prior to activating the circuitry which establishes a connection automatically to the first idle line, additional circuitry is required in the station module. Also, a change is needed in the program instructions. The additional circuitry is shown in FIG. 15 and it consists of a two input AND gate whose output connects to a conventional timing circuit. The inputs of the AND gate connect to conductors 171 and 172 which are shown in FIG. 6. When the signal level on those conductors is respectively 0, 0 (off-hook state), the timer is activated. The timer output is connected to multiplexer 81 (FIG. 6), so that its output can be combined logically in calculator 80. If we assume the term TOH designates the timer output, then the foregoing instructions 103 and 104 can be deleted and replaced by the following single instruction to interpose an interval for manual selection:

$$X = \mathbf{TOH} \cdot X.$$

If $R = 1$ as a result of the computations, then it is determined that an idle line connection should be made. The next group of instructions initiates line tests in search of an idle line.

107. $BR=111$
108. $RD=0$
109. If $R=1$ and $MISM=0$, $CD \rightarrow BR; CD=0$
110. If $R=1$ and $MISM=0$, $DR \rightarrow DR; CD \rightarrow BR; CD=1 \therefore BR=101$ (Button No. 6)
111. If $R=1$, READ:ONE At this point in the program the line module associated with Button No. 6 is interrogated to determine the idle-busy state of the line connected to the line module. The answer from the line module is stored in the T bit register. If the T bit is 0, the line is idle and if it is 1 the line is either busy or there is no line associated with this button position. It is to be noted in the following instructions that once a 1 in the T bit position is detected, the button register is no longer advanced. This occurs because the advancing instructions are conditional instructions. However, the T bit function may be recalculated numerous times depending upon the location or button position of the idle line. This redundant calculation, however, has no effect on the system operation.

112. $X=X \cdot T$
113. $R=0$
114. $R=R+X \therefore R=T$
115. If $R=1$ and $MISM=0$, $CD \rightarrow BR; CD=1$
116. If $R=1$ and $MISM=0$, $DR \rightarrow DR; CD \rightarrow BR; CD=0 \therefore BR=011$ (Button No. 5)
117. If $R=1$, READ:ONE
118. Repeat instruction 112
119. Repeat instruction 113
120. Repeat instruction 114
121. If $R=1$ and $MISM=0$, $CD \rightarrow BR; CD=1$
122. If $R=1$ and $MISM=0$, $DR \rightarrow DR; CD \rightarrow BR; CD=1 \therefore BR=110$ (Button No. 4) 123. Repeat instruction 117
124. Repeat instruction 112
125. Repeat instruction 113
126. Repeat instruction 114
127. If $R=1$ and $MISM=0$, $CD \rightarrow BR; CD=0$
128. If $R=1$ and $MISM=0$, $CD \rightarrow BR; CD=0$
129. If $R=1$ and $MISM=0$, $CD \rightarrow BR; CD=0$
130. If $R=1$ and $MISM=0$, $DR \rightarrow DR; CD \rightarrow BR; CD=1 \therefore BR=100$ (Button No. 3)
131. Repeat instruction 117
132. Repeat instruction 112
133. Repeat instruction 113
134. Repeat instruction 114
135. If $R=1$ and $MISM=0$, $CD \rightarrow BR; CD=0$
136. If $R=1$ and $MISM=0$, $CD \rightarrow BR; CD=0$ 137. If $R=1$ and $MISM=0$, $DR \rightarrow DR$; $CD \rightarrow BR$; $CD=0$ ∴ $BR=000$ (Button No. 2)
138. Repeat instruction 117
139. Repeat instruction 112
140. Repeat instruction 113
141. Repeat instruction 114
142. If $R=1$ and $MISM=0$, $CD \rightarrow BR$; $CD=1$
143. If $R=1$ and $MISM=0$, $CD \rightarrow BR$; $CD=0$
144. If $R=1$ and $MISM=0$, $DR \rightarrow DR$; $CD \rightarrow Br$; $CD=0$ ∴ $BR=001$ (Button No. 1)
145. Repeat instruction 117
146. Repeat instruction 112
147. Repeat instruction 113
148. Repeat instruction 114

At this point if $R=1$, no lines were idle. The following set of instructions reset the button register to the no connect code (111) to prevent the transmission of false intermodule signals during subsequent program routines.

149. If $R=1$ and $MISM=0$, $CD \rightarrow BR$; $CD=1$
150. If $R=1$ and $MISM=0$, $CD \rightarrow BR$; $CD=1$
151. If $R=1$ and $MISM=0$, $CD \rightarrow BR$; $CD=1$ In accordance with an important aspect of this invention, after a line has been utilized on a call and released, the line module associated with the line maintains a busy state. This insures that the call traffic on all lines at each set is equally apportioned. At this point in the program, the condition $R=1$ indicates that all lines are presently in a busy condition. Instruction 152 causes a signal to be sent to all lines requesting that all existing artificially busy conditions be removed. Those lines actually engaged on a call are unaffected by the signal. Thus, when the FILP routine is repeated on the next cycle, additional lines will be available.

152. If $R=1$, READ:ALL

Because of the possibility of a state change while the subroutine is being run, the status of the line and of the station are verified before a connection is actually established.

153. If $R=1$, READ:ONE
154. $X=1$
155. $X=X \cdot T$
156. $R=0$
157. $X=X \cdot \overline{Y_1}$
158. $X=X \cdot \overline{Y_2}$
159. $X=X \cdot NI$
160. $R=R+X$ ∴ $R=NI \cdot \overline{Y_2} \cdot \overline{Y_1} \cdot T$ If at this point all the conditions are satisfied; i.e., switchhook, station set and line module status are verified, $R=1$. The last instruction connects the station set to the idle line.

161. If $R=1$, $NI=0$

Sub-Routine L: Automatic Connection of a Ringing Line to an Off-Hook Station

The ensuing instructions locate ringing lines and connect those lines to an off-hook station set without the necessity for a button depression at the station set. The connection is, however, delayed so that the subscriber can avoid answering and thereby "Tripping the ring" by depressing another line button.

162. $R=1$
163. READ:ALL (ALL lines in a ringing condition return a "1" signal which is logically combined and stored in the T bit.)
164. $X=1$
165. $R=0$
166. $X=T \cdot X$
167. $R=R+X$ ∴ $R=T$ If $R=1$, one of the connected lines is being rung. Next, determine whether any subscriber is off-hook and if so, add a "1" to the R bit.

168. $R=0$
169. $X=Y_1 \cdot X$ ($\overline{Y_1} \cdot \overline{Y_2}=1$ indicates off-hook)
170. $X=\overline{Y_2} \cdot \overline{Y_1} \cdot X \cdot NC$
171. $R=X$ ∴ $R=T \cdot \overline{Y_1} \overline{Y_2} \cdot NC$ The next condition to be ascertained is whether or not a button is depressed.

172. $R=0$
173. $X=\overline{MISM} \cdot X$ ($MISM=1$ if button depressed)
174. $R=X$ ∴ $R=\overline{MISM} \cdot \overline{Y_2} \cdot \overline{Y_1} \cdot T$ The next set of instructions selects one line if more than one line is being rung at the same time and ascertains the button code of that line. The code associated with the first ringing line is stored in the button register.

175. If $R=1$, $CD \rightarrow BR$; $CD=1$
176. If $R=1$, $CD \rightarrow BR$; $CD=0$
177. If $R=1$, $CD \rightarrow BR$; $CD=0$ ∴ $BR=001$ (code of Button No. 1)
178. If $R=1$, READ:ONE
179. $R=0$
180. $X=\overline{T} \cdot X$ ($T=1$ if line No. 1 is ringing)
181. $R=X \cdot \overline{MISM} \cdot \overline{Y_2} \cdot \overline{Y_1} \cdot \overline{T}$ This function is "0" if $\overline{T}$ added to previously calculated R bit is 0.

182. If $R=1$, $CD \rightarrow BR$; $CD=0$ ∴ $BR=000$ (code of Button No. 2)
183. If $R=1$, READ:ONE
184. $R=0$
185. $X=\overline{T} \cdot X$
186. $R=X$
187. If $R=1$, $CD \rightarrow BR$; $CD=1$ ∴ $BR=100$ (code of Button No. 3)
188. If $R=1$, READ:ONE
189. $R=0$
190. $X=\overline{T} \cdot X$
191. $R=X$
192. If $R=1$, $CD \rightarrow BR$; $CD=1$ ∴ $BR=110$ (code of Button No. 4)
193. If $R=1$, READ:ONE
194. $R=0$
195. $X=\overline{T} \cdot X$
196. $R=X$
197. If $R=1$, $CD \rightarrow Br$; $CD=0$ ∴ $BR=011$ (code of Button No. 5)
198. If $R=1$, READ:ONE
199. $R=0$
200. $X=\overline{T} \cdot X$
201. $R=X$
202. If $R=1$, $CD \rightarrow BR$; $CD=1$ ∴ $BR=101$ (code of Button No. 6)
203. If $R=1$, READ:ONE
204. $R=0$
205. $X=\overline{T} \cdot X$
206. $R=X$ The code of one of the ringing lines is now in button register 40 and the R bit = 0. However, R bit must be reset to "1" to utilize SEND instructions.

207. $X=1$
208. $R=X$

209. If $R=1$, SEND:ONE (This signal increments a counter of the line module to delay the connection.)
210. READ:ONE (If the counter is now at a full count, a "1" signal is returned and stored in the T bit.)
211. $R=0$
212. $X=1$
213. $X=T\cdot X$
214. $R=R+X \therefore R=T$
215. If $R=1, BR \rightarrow MR$
216. If $R=1, BR \rightarrow MR$
217. If $R=1, BR \rightarrow Mr$
218. If $R=1, NI=0$ Return to Sub-Routine A, the first instruction.

SUMMARY

Additional station sets and lines may be added readily by the connection to the system of additional station modules associated with each added station set, a line module for each added CO/PBX line and appropriate cross-connection wiring in the service designation field. It is noteworthy that a connection to the six wire bus is sufficient to integrate the added modules into the system operation.

While six-button station sets have been discussed in detail herein, additional lines may be provided at any station set, such as shown herein for set 3 by connection of a second and a third station modules, each with the capability of processing six additional lines for that station set.

Portions of the program and feature operations can be implemented on an optional basis by interposing a cross-connection field between the input wiring to multiplexer 81 (FIG. 6) and multiplexer 81. In this manner one program containing all possible features can be written and changes in the system operation facilely implemented by removing one or more inputs to the multiplexer.

What is claimed is:

1. In a key telephone system having a plurality of communication lines and a key station including a plurality of nonlocking buttons each associated with individual ones of said lines, means enabled upon depression of said buttons for coupling the associated ones of said lines to said station, means responsive to an off-hook condition of said station for determining the idle-busy state of said lines, and means responsive to said determining means when said coupling means is not enabled for connecting an idle one of said lines to said station thereby eliminating the necessity for depressing said buttons to select an idle line.

2. The invention set forth in claim 1 further including means for interposing a time delay prior to determining the idle-busy state of said lines to allow for the manual selection of a line by depression of one of said buttons.

3. The invention recited in claim 2 wherein said interposing means includes means detecting said off-hook condition, and timing means responsive to said detecting means for timing a prescribed interval after which said determining means is activated.

4. The invention set forth in claim 1 further including means for distributing call traffic on said lines, and wherein said distributing means comprises means for busying ones of said lines after being connected to said station, and means for holding said lines busy until all of said lines are in a busy state.

5. A key telephone system comprising a plurality of communication lines, at least one key station having a plurality of nonlocking buttons each associated with individual ones of said lines, means connected to said buttons and responsive to the depression of one of said buttons for establishing an exclusive connection between said station and said associated one of said lines, means periodically monitoring said station for a change in switchhook status, means responsive upon detection of a change from on-hook to off-hook status for sequentially testing each of said lines for the idle-busy state thereof, and means responsive to said monitoring means independent of said establishing means for connecting an idle one of said lines to said station.

6. The invention set forth in claim 5 further including a memory for recording codes identifying said buttons, means generating consecutively the codes for each one of said buttons for storage in said memory, and means connected to said memory for directing the sequential testing of said lines.

7. The invention set forth in claim 5 further including means for maintaining a busy state on each one of said lines which have been connected to said station, and means responsive in the event all of said lines indicate a busy state for removing the busy state on idle ones of said lines.

8. The invention recited in claim 5 further including means actuated in the event the state of all of said tested lines is busy for initiating periodically additional tests of said lines until an idle one of said lines is found.

9. The invention recited in claim 5 further including means for discerning a seizure of an idle one of said lines to serve two or more of said key stations, and said discerning means includes means actuated once a said idle line is found for beginning a second test of said idle line, and means inhibiting a connection to said idle line if the second test indicates a busy state.

10. The invention recited in claim 5 further including means for verifying the off-hook condition of said station after said idle line is found.

11. The machine method of connecting idle lines to key telephone stations via a key station network unique to each of the stations without the necessity for depressing a key associated with the idle line by performing the steps of:

1. scanning each of the stations for an off-hook switchhook status,
2. ascertaining the networks associated with off-hook stations found during step (1) for network connections,
3. verifying the data ascertained in step (1) by repeating step (1) and comparing the status indications,
4. generating codes consecutively for the key positions at off-hook stations,
5. testing the idle-busy state of lines associated with the codes generated in step (4), and
6. connecting off-hook stations to the first idle lines found in step 5.

12. The method recited in claim 11 further including the additional steps of:

1. busying lines connected in step (6) of claim 11, and 2. removing the busy condition applied in step (1) when all of the lines associated with a station are indicating a busy state.

13. A program controlled key telephone system having a plurality of communication lines, a multibutton station set, a plurality of line modules and station modules connected to a source of cyclically generated instruction signals, means in each one of said station modules controlled by said signals for periodically scanning said station set for switchhook status and button depressions, means controlled by said signals in the event an off-hook status is detected and no buttons are depressed for testing the idle-busy status of said lines, and means jointly responsive to said testing and monitoring means for connecting an idle one of said lines to said station set.

14. The invention recited in claim 13 wherein said station module includes means under control of said signals for delaying the connection of said idle line to said station set so that a manual line selection can be made at said station set by depression of a button.

15. The invention recited in claim 13 wherein each of said line modules includes means responsive to said signals for busying the associated one of said lines, and means for removing said busy condition in response to said signals and under control of said station modules in the event all of said lines at said set are busy.

16. In combination in a key telephone system; a plurality of communication lines; a plurality of station sets including a plurality of line pickup buttons thereat; particular ones of said lines being associated with individual ones of said buttons at each of said station sets; a station module connected to each of said sets as well as a line module connected to each of said lines; a source of cyclically generated program instruction signals; a data bus connecting said signals to said line modules and station modules concurrently to control the operations thereof; and each of said station modules includes means for scanning each of said sets for switchhook status, means responsive to the detection of an off-hook condition for testing said lines for an idle line, means activated if an idle line is detected for verifying the switchhook status of the associated one of said station sets, and means for connecting said idle line to said off-hook set if the switchhook status is verified.

17. A method for controlling a distributed data processor in the establishment of call connections between a key telephone station set and idle communication lines without the necessity for manually selecting lines; said processor including line modules each connected to a particular one of said lines and having means for indicating the idle-busy states thereof; a station module having a memory for storing data, means for scanning said station set to determine key depressions and the switchhook status of said set, means for sending intermodule signals to said line modules, and means for connecting said lines to said station set; and a clock generating iterative instruction signals which connect to said station module and line modules to direct system operations in performing the steps of:

1. controlling said scanning means to scan said set for key depressions which indicate a manual selection of a line and for an off-hook status of said set,
2. recording sequentially in said memory an identifying code for each key of said set utilizing said instruction signals to generate such codes,
3. controlling said sending means when no manual selections are indicated and an off-hook status is detected during step (1) to signal sequentially particular ones of said line modules in accordance with said codes as recorded in step (2).
4. controlling each of said line modules signaled in accordance with step (3) to indicate the idle-busy state of associated lines,
5. controlling said sending means to end further signaling of said line modules upon the indication of an idle line state, and
6. controlling said connecting means to establish a connection from said idle line to set.

18. The method set forth in claim 17 in which said station module also includes means for timing a prescribed period and further comprising the operational steps of:

1. controlling said timing means to begin timing said period upon the determination of an off-hook status in accordance with step (1) of claim 16, and
2. controlling said sending means to delay the transmission of intermodule signals to said line modules until the cessation of said timed period.

19. The method set forth in claim 17 further comprising the steps of:

1. controlling said sending means to signal said line module associated with the idle line a second time, and
2. controlling said last-mentioned line module to return a busy indication when said idle line is selected for connection to two station sets.

20. A new use of a key telephone system having a plurality of communication lines; a plurality of station sets including a plurality of line pickup buttons thereat, particular one of said lines being associated with individual ones of said buttons at each of said station sets; a station module connected to each of said sets and a line module connected to each of said lines; and a source of cyclically generated program instructions signals; said new use comprising the steps of scanning each of said sets for switchhook status;
testing said lines for an idle line responsive to the detection of an off-hook status at one of said sets;
verifying the switchhook status of the associated one of said station sets on detection of an idle line; and
connecting the idle line to said off-hook set after its switchhook status has been verified without requiring depression of the pickup key associated with the idle line at said off-hook set.

21. The new use in accordance with claim 20 further comprising the steps of maintaining a busy indication on the line used in that connection until all the lines at the station set have been used at least once and removing the maintained busy indications when no idle lines are found upon testing of all the lines at said station set.

* * * * *